US011528336B2

(12) United States Patent
Xiong et al.

(10) Patent No.: US 11,528,336 B2
(45) Date of Patent: *Dec. 13, 2022

(54) DECENTRALIZED METHOD AND SYSTEM FOR ACCURATELY DETERMINING A LEVEL OF ACTIVITY OF A CLIENT DEVICE

(71) Applicant: Oath Inc., New York, NY (US)

(72) Inventors: Yucheng Xiong, Santa Clara, CA (US); Matti Juhani Oikarinen, Los Altos, CA (US); Abhishek Kothari, San Jose, CA (US); Manika Mittal, Sunnyvale, CA (US); Rohit Vijayakumar Athanikar, Sunnyvale, CA (US); Saravanan Murugesan, Sunnyvale, CA (US); Ravindra Lakkappa Dangar, Sunnyvale, CA (US); Suresh Kumar Thiruvallur Loganathan, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,002

(22) Filed: Jul. 6, 2020

(65) Prior Publication Data

US 2020/0336559 A1    Oct. 22, 2020

Related U.S. Application Data

(63) Continuation of application No. 16/185,205, filed on Nov. 9, 2018, now Pat. No. 10,708,373.

(51) Int. Cl.
*H04L 29/08* (2006.01)
*H04L 67/54* (2022.01)
(Continued)

(52) U.S. Cl.
CPC .............. *H04L 67/54* (2022.05); *H04L 67/01* (2022.05); *H04L 69/16* (2013.01)

(58) Field of Classification Search
CPC ......... H04L 67/24; H04L 69/16; H04L 67/42; H04L 63/1408; H04L 63/1466; H04L 2463/144; H04L 2463/142; H04L 63/1458
See application file for complete search history.

(56) References Cited

U.S. PATENT DOCUMENTS 8,711,861 B2 * 4/2014 Goyal .................... G06F 12/04
370/392
10,931,691 B1 * 2/2021 Kapelevich ............ G06N 7/005
(Continued)

*Primary Examiner* — Michael Won
(74) *Attorney, Agent, or Firm* — Cooper Legal Group LLC

(57) ABSTRACT

One or more computing devices, systems, and/or methods for monitoring levels of activity of client devices using a cluster of servers having a decentralized network architecture are provided, where over-counting, which may be caused by an uneven distribution of requests transmitted by the client devices to the cluster of servers, may be mitigated. For example, a request may be received by a first server, of the cluster of servers, from a client device. A first counter value associated with a level of activity of the client device may be incremented by a first number. One or more data packets may be transmitted to one or more servers of the cluster of servers. Each data packet of the one or more data packets may comprise an instruction to increment a counter value associated with the client device by a second number, which may be different than the first number.

20 Claims, 19 Drawing Sheets

(51) Int. Cl.
    *H04L 69/16*     (2022.01)
    *H04L 67/01*     (2022.01)

(56) References Cited

U.S. PATENT DOCUMENTS

| | | | | |
|---|---|---|---|---|
| 2018/0295150 | A1* | 10/2018 | Oikarinen | H04L 63/1441 |
| 2019/0251275 | A1* | 8/2019 | Ramrakhyani | G06F 21/6218 |
| 2019/0361849 | A1* | 11/2019 | Rogynskyy | G06F 16/24578 |
| 2020/0153919 | A1* | 5/2020 | Xiong | H04L 67/42 |
| 2020/0280565 | A1* | 9/2020 | Rogynskyy | G06N 20/00 |

\* cited by examiner

DECENTRALIZED METHOD AND SYSTEM FOR ACCURATELY DETERMINING A LEVEL OF ACTIVITY OF A CLIENT DEVICE

RELATED APPLICATION

This application claims priority to and is a continuation of U.S. application Ser. No. 16/185,205, filed on Nov. 9, 2018, entitled "A DECENTRALIZED METHOD AND SYSTEM FOR ACCURATELY DETERMINING A LEVEL OF ACTIVITY OF A CLIENT DEVICE", which is incorporated by reference herein in its entirety.

BACKGROUND

Services may be performed by a system based upon requests received from client devices, such as authentication requests, requests for content (e.g., emails, messages, news content, videos, music, bank account information, etc.), requests to perform actions (e.g., setting up user accounts, sending emails, sending messages, uploading content to platforms, transferring funds, etc.), etc. Levels of activity of the client devices may be monitored, and client devices having levels of activity greater than an activity threshold may be blocked (e.g., temporarily, permanently, etc.) in order to prevent malicious users and/or internet bots from abusing the system.

SUMMARY

In accordance with the present disclosure, one or more computing devices and/or methods are provided. In an example, a first server may receive a request for a service from a client device. Responsive to receiving the request, a first counter value associated with a level of activity of the client device may be incremented by a first number. One or more data packets may be transmitted to one or more servers of a plurality of servers. Each data packet of the one or more data packets may comprise an instruction for a server of the one or more servers to increment a counter value associated with the client device by a second number. The second number may be equal to a combination of the first number, a third number and a fourth number. The third number may be equal to a first quantity of servers of the plurality of servers. The fourth number may be equal to a second quantity of servers of the one or more servers.

In an example, a first server may receive a request for a service from a client device. Responsive to receiving the request, a first counter value associated with a level of activity of the client device may be incremented by a first number. The first counter value may be associated with requests received from the first client device. The first number may be equal to a combination of a second number and a third number. The second number may be equal to a first quantity of servers of a cluster of servers comprising the first server. Each server of the cluster of servers may share information associated with levels of activity of client devices with other servers of the cluster of servers. The third number may be equal to a second quantity of servers of a plurality of servers. The plurality of servers may comprise the first server and/or one or more other servers of the cluster of servers. One or more data packets may be transmitted to the one or more other servers. Each data packet of the one or more data packets may comprise an instruction for a server of the one or more other servers to increment a counter value associated with the client device by the first number. The first server may receive, from a second server of the cluster or servers, a data packet comprising an instruction for the first server to increment a second counter value associated with the level of activity of the client device by the first number. The second counter value may be associated with data packets received from servers of the cluster of servers. Responsive to receiving the data packet, the second counter value may be incremented by the first number. The level of activity may be determined based upon the first counter value and the second counter value.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
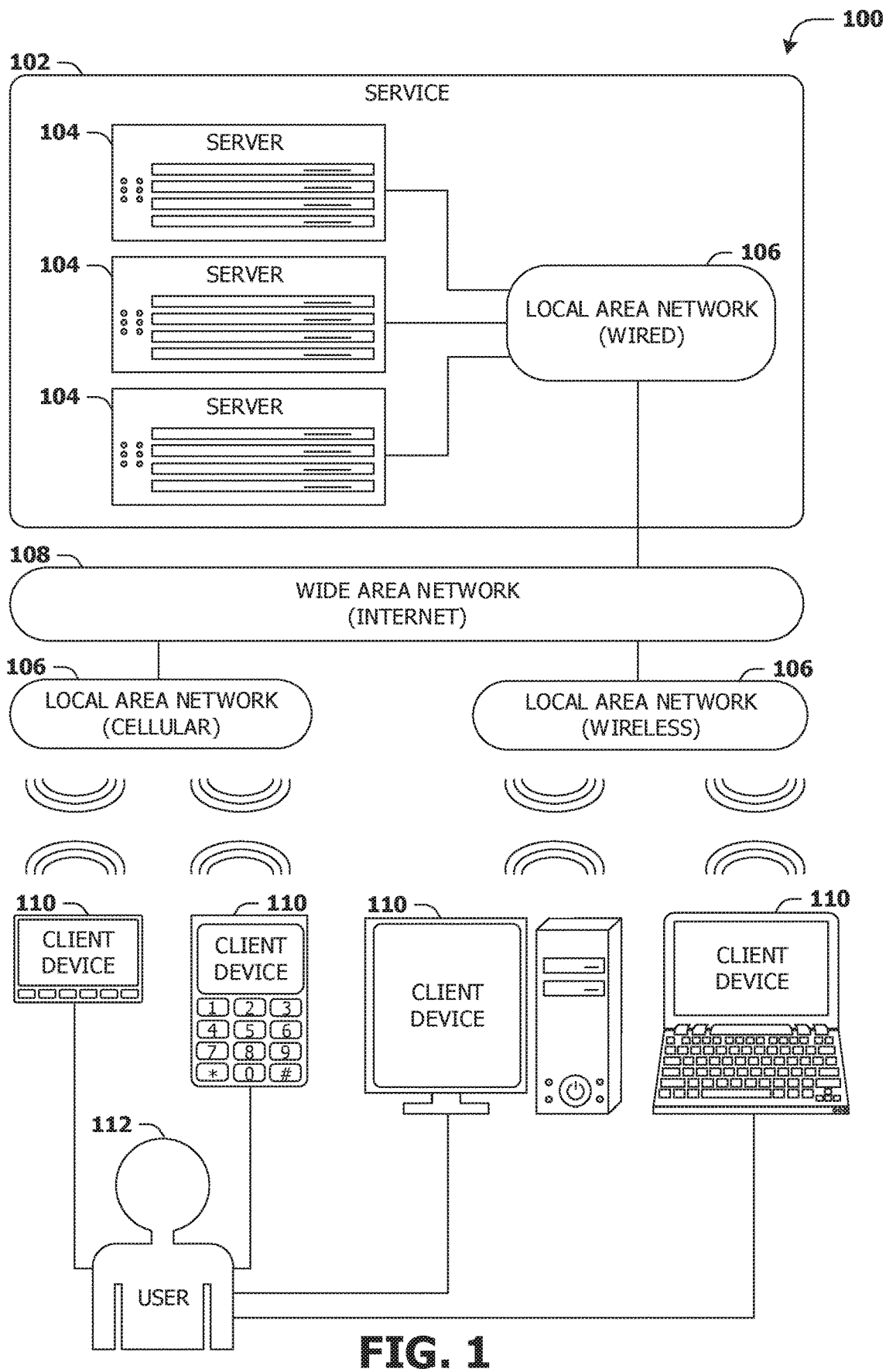
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
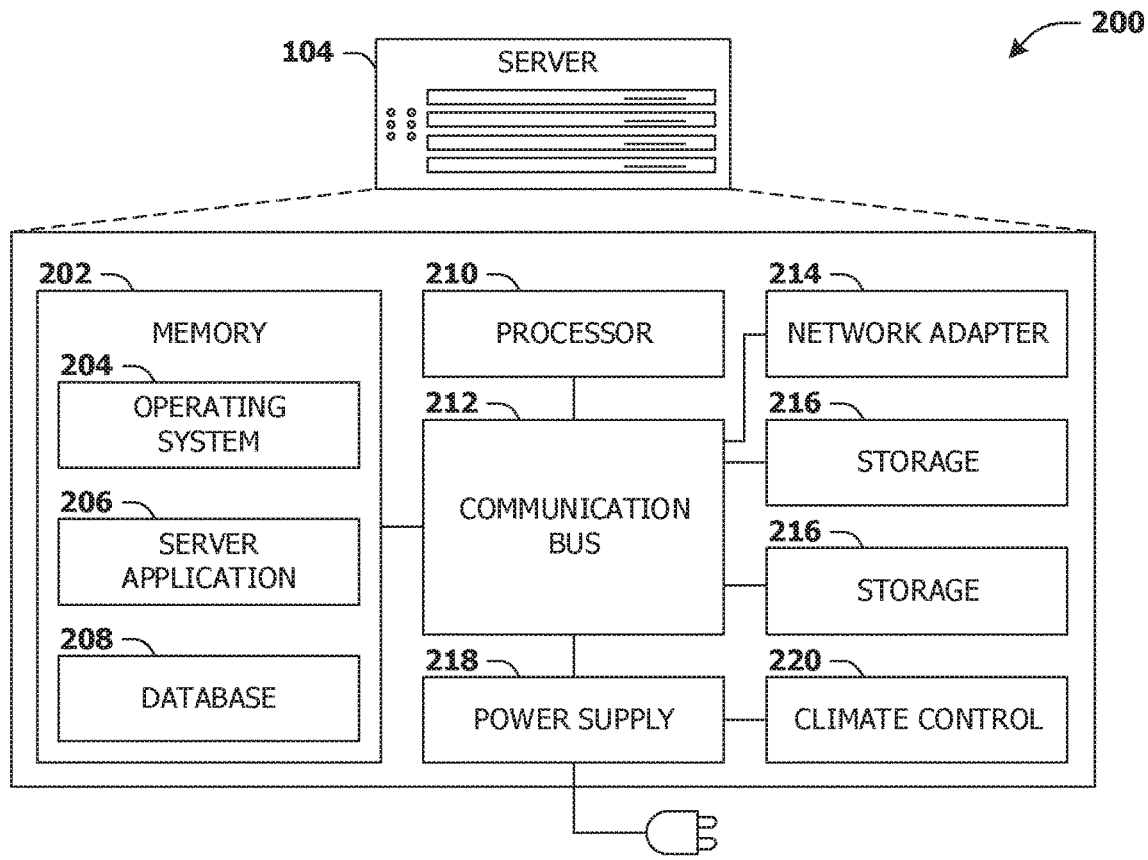
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
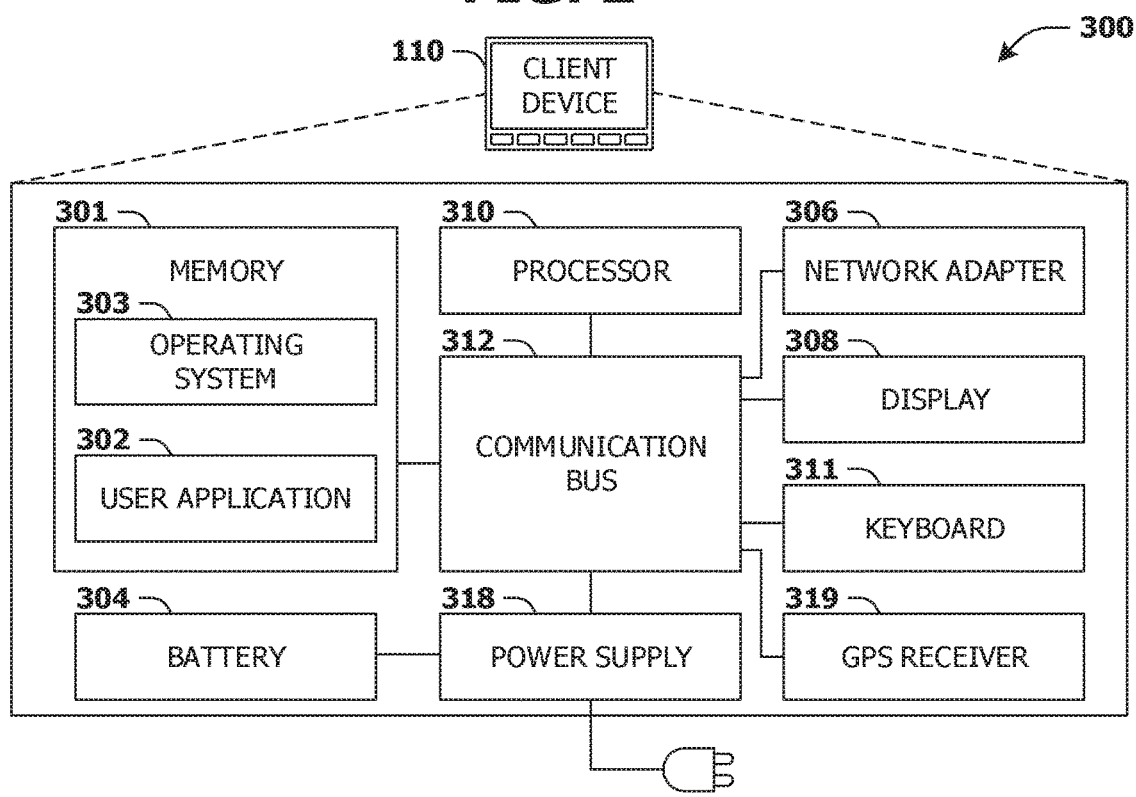
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for monitoring levels of activity of client devices are provided. For example, a system may perform one or more services, such as provide client devices with access to resources, provide content to the client devices, receive and/or upload content and/or data, etc. The system may be associated with a service such as an email service, a messaging service, a social network service, a bank account service, a web browsing service, a web searching service, a web gaming service, an electronic commerce service, a content (e.g., audio, video, images, etc.) service, etc. Levels of activity of client devices using the system may be determined in order to detect whether activity of a client device is malicious activity (e.g., spamming, denial of service attacks, hacking attacks, etc.) and/or for a different purpose. For example, a cluster of servers associated with the system may receive requests for services (e.g., authentication requests, requests for content, etc.) from client devices.

The cluster of servers may comprise a decentralized network architecture, such as a peer-to-peer network architecture, where rather than (and/or in addition to and/or without depending upon) using a centralized approach of storing level of activity information determined by each server of the cluster of servers in a centralized database, the level of activity information may be shared between servers of the cluster of servers (e.g., using a decentralized approach). For example, each server of the cluster of servers may share level of activity information associated with client devices with other servers of the cluster of servers. In some examples, levels of activity may be determined based upon a number of requests received from a client device. For example, a first server may receive a first request for a service from a first client device. The first server may increment a first counter value, associated with a first level of activity corresponding to the first client device. The first server may also transmit a plurality of data packets to each server of the cluster of servers excluding the first server. Each data packet of the plurality of data packets comprises an instruction for a server to increment a counter value corresponding to the first client device. However, especially in instances where the cluster of servers comprises a relatively large amount of servers, transmitting a data packet to each server of the cluster of servers excluding the first server may consume a considerable amount of resources of the first server. Thus, in accordance with one or more of the techniques presented herein, the first server may transmit one or more data packets to merely a subset of servers of the cluster of servers (e.g., each data packet of the one or more data packets may comprise an instruction for a server to increment a counter value associated with the client device).

Figure 4A:
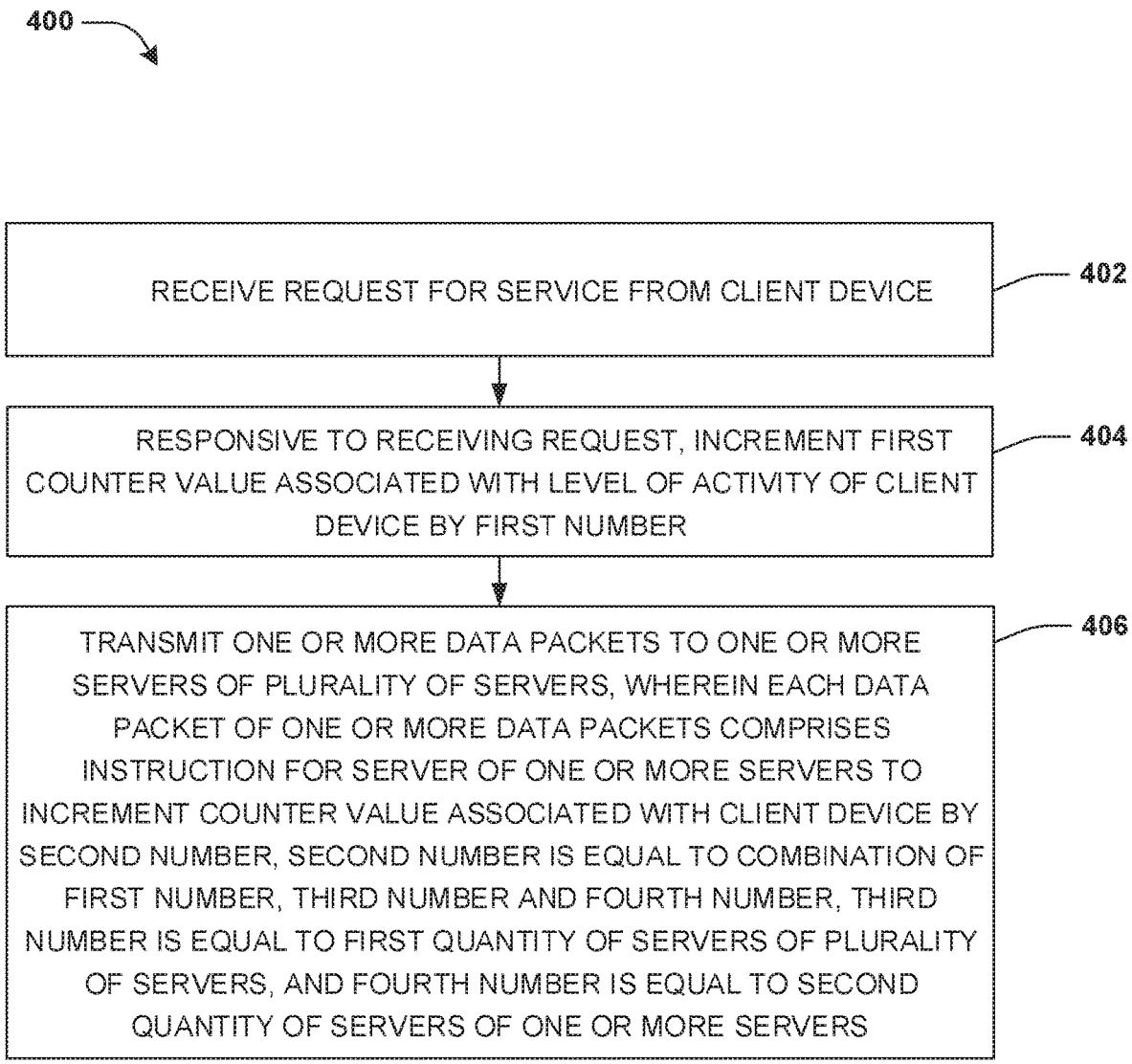
FIG. 4A is a flow chart illustrating an example method for monitoring levels of activity of client devices.

An embodiment of monitoring levels of activity of client devices is illustrated by an example method 400 of FIG. 4A. A system may perform one or more services, such as provide client devices with access to resources, provide content to the client devices, receive and/or upload content and/or data, etc. The system may be associated with a service such as an email service, a messaging service, a social network service, a bank account service, a web browsing service, a web searching service, a web gaming service, an electronic commerce service, a content (e.g., audio, video, images, etc.) service, etc. Levels of activity associated with client devices using the system may be determined in order to detect whether activity of a client device is malicious activity (e.g., spamming, denial of service attacks, hacking attacks, etc.) and/or for a different purpose. For example, the levels of activity may be used for determining statistics associated with the levels of activity (e.g., average resource usage of client devices, median resource usage of client devices, times of day that levels of activity are higher, etc.). For example, the statistics may be used for modifying and/or updating components of the system based upon the statistics and/or for adjusting and/or modifying platforms and/or interfaces associated with the system based upon the statistics.

A cluster of servers associated with the system may receive requests for services (e.g., authentication requests, requests for content, etc.) from client devices. The cluster of servers may comprise a decentralized network architecture, such as a peer-to-peer network architecture, where rather than (and/or in addition to) using a centralized approach of storing level of activity information determined by each server of the cluster of servers in a centralized database, the level of activity information may be shared between servers of the cluster of servers (e.g., using a decentralized approach). For example, servers of the cluster of servers may share information associated with levels of activity of client devices with other servers of the cluster of servers. Counter values associated with levels of activity of client devices may be stored on servers of the cluster of servers and/or the counter values may be updated and/or modified based upon communications (e.g., requests) received from client devices and/or based upon communications between the servers of the cluster of servers.

At 402, a first request for a service may be received by a first server from a first client device. In some examples, the first server may be a part of the cluster of servers (e.g., the cluster of servers may comprise the first server). The first request may be an authentication request, a request for content (e.g., a request to download one or more images, audio, such as songs and/or one or more videos, such as movies), a request to transmit an email, a request to access one or more resources (e.g., a request to access a banking account, an email account, and/or a different type of user account), etc.

Alternatively and/or additionally, the first request may be received from the first client device via a network connection (e.g., the first client device may be connected to the network connection, which may be the Internet). For example, the first request may be received via a system interface (e.g., a webpage interface, an application, an email interface, a messaging interface, etc.) associated with the system (e.g., the system interface may be displayed using the first client device). For example, the system interface may comprise one or more selectable inputs (e.g., a download and/or play button associated with a content interface, a login button associated with a user account, a send button, etc.). Responsive to a selection of a selectable input of the one or more selectable inputs by the first client device (and/or by a user associated with the client device), the first request may be transmitted by the first client device to the first server.

At 404, responsive to receiving the first request, a first counter value associated with a first level of activity of the first client device may be incremented by a first number. For example, the first counter value may be used to monitor the first level of activity of the first client device. The first counter value may correspond to an activity counter maintained by the first server. For example, the first counter value may be incremented each instance that a request for a service is received (by the first server) from the first client device. In an example, if the first counter value is equal to 236 upon receipt of the first request and/or if the first number is equal to one, then the first counter value may be incremented to 237.

In some examples, the first counter value may be stored within a first database of the first server. For example, the first counter value may be stored within a first list, a first array, a first table (e.g., a first hash table) and/or a first cache of the first database. The first database may comprise information associated with the user and/or the first client device. For example, the first database may comprise user information (e.g., a user profile, user interests, user behavioral information, user attributes, user preferences, user demographic information, user location information, etc.) and/or client device information (e.g., device identification information, device capability information, carrier information, an Internet Protocol (IP) address, etc.). Alternatively and/or additionally, one or more client identifiers associated with the first client device may be stored in the first database. For example, the one or more client identifiers may comprise an indication of a first location corresponding to the first client device and/or a network that the first client device is connected to (e.g., a country, a state, a province, a city, an area, etc.), the IP address associated with the first client device, the device identification information, etc. Alternatively and/or additionally, the first database may comprise temporal information associated with the first client device. For example, the temporal information may comprise one or more timestamps. The one or more timestamps may be associated with times that one or more requests are received from the first client device. Alternatively and/or additionally, the one or more timestamps may be associated with times that the first counter value was modified (e.g., incremented, decremented, etc.).

In some examples, the first request may comprise one or more second client identifiers. For example, the one or more second client identifiers may comprise a representation of the first location, a representation of the IP address, a representation of the device identification information, etc. In some examples, the first counter value may be identified based upon a comparison of the one or more second client identifiers (comprised within the first request) with the one or more client identifiers (comprised within the first database). For example, the first counter value may be selected for being incremented based upon a determination that the first request is associated with the first counter value.

In some examples, the first number may be one. Alternatively and/or additionally, the first number may be a number different than one (e.g., two, 2.5, four, five, 10, etc.). In some examples, the first number may be based upon the user information and/or the client device information of the first database (e.g., the first number may be calculated, generated, determined, etc. based upon the user information and/or the client device information). For example, the first number may be determined based upon the first location corresponding to the first client device. For example, if the first location is comprised within a first set of locations (e.g., a set of one or more locations (e.g., countries, areas, etc.) that are blacklisted and/or suspicious and/or that may receive a different level of service than other locations, etc.), the first number may be greater than if the first location were comprised within a second set of locations (e.g., a second set of one or more locations that are not blacklisted and/or suspicious, etc.). For example, if the first location is comprised within the first set of locations, the first number may be greater than if the first location were comprised within the second set of locations. Alternatively and/or additionally, the first number may be determined based upon the IP address and/or different information associated with the first client device. For example, it may be determined that the first client device and/or the IP address are blacklisted and/or suspicious by analyzing a database of blacklisted and/or suspicious entities (e.g., IP addresses, network addresses, client device identifiers, etc.). If the first client device and/or the IP address are determined to be blacklisted and/or suspicious, the first number may be greater than if the first client device and/or the IP address are determined to not be blacklisted and/or not suspicious. Alternatively and/or additionally, responsive to a determination that the first client device and/or the IP address are blacklisted and/or suspicious, the first client device may be blocked from accessing resources.

In some examples, responsive to receiving the first request, the temporal information comprised within the first database may be analyzed to determine a first timestamp. The first timestamp may be associated with a second request for a service (e.g., authentication request, etc.) that was received from the first client device prior to receiving the first request (e.g., the first timestamp may be comprised within the second request, the first timestamp may be generated responsive to receiving the second request, etc.). Alternatively and/or additionally, the first timestamp may be associated with a first data packet received from a second server of the cluster of servers comprising an instruction for the first server to increment the first counter value (e.g., the first data packet may be received prior to receiving the first request). For example, the first timestamp may be associated with an instance that the second server received a seventh request from the first client device corresponding to the first data packet (e.g., the first data packet may be generated by the second server based upon the seventh request), an instance that the second server transmitted the first data packet and/or an instance that the first data packet was received by the first server.

In some examples, the first counter value may be decremented based upon a comparison of the first timestamp and a first time associated with the first request being received by the first server. The first time may be determined based upon a second timestamp (e.g., the second timestamp may be generated responsive to receiving the first request, the second timestamp may be comprised within the first request, etc.). For example, the first counter value may be decremented based upon an exponential decay function and/or a linear decay function (e.g., the exponential decay function and/or the linear decay function may be based upon time) and/or a different decay function. For example, the exponential decay function, the linear decay function and/or a different decay function may be applied to (a combination of) a second time associated with the first timestamp and/or the first time to calculate a first decrement number (e.g., the first counter value may be decremented by decreasing the first counter value by the first decrement number). For example, the first counter value may be decremented based upon a difference in time between the second time and the first time.

In some examples, the first decrement number may be equal to the first number. Alternatively and/or additionally, the first decrement number may be different than the first number. The first decrement number may be one. Alternatively and/or additionally, the first decrement number may be a number different than one (e.g., two, 2.5, four, five, 10, etc.). In some examples, the first decrement number may be based upon the user information and/or the client device information of the first database (e.g., the first decrement number may be calculated, generated, determined, etc. based upon the user information and/or the client device information). For example, the first decrement number may be determined based upon the first location. For example, if the first location is comprised within the first set of locations, the first decrement number may be less than if the first location were comprised within the second set of locations. Alternatively and/or additionally, the first decrement number may be determined based upon the IP address and/or different information associated with the first client device. For example, if the first client device and/or the IP address are determined to be blacklisted and/or suspicious, the first decrement number may be greater than if the first client device and/or the IP address are determined to not be blacklisted and/or not suspicious.

In some examples, responsive to receiving the first request, one or more operations may be performed. For example, the one or more operations may be performed based upon an analysis of the first counter value. For example, the one or more operations may be performed based upon a comparison of the first counter value with a threshold counter value (e.g., 50, 100, 140, 600.4, etc.). For example, the first counter value may be compared with the threshold counter value responsive to receiving the first request and/or prior to incrementing the first counter value by the first number. Alternatively and/or additionally, the first counter value may be compared with the threshold counter value responsive to incrementing the first counter value by the first number (e.g., after the first counter value is incremented by the first number).

In some examples, the threshold counter value may be associated with a throttle limit. For example, the threshold counter value (e.g., the throttle limit) may be used to limit a number of instances that resources are used by the cluster of servers and/or the system responsive to receiving requests from the first client device. For example, responsive to a determination that the first counter value (e.g., 594) is less than the threshold counter value (e.g., 843), one or more requested services associated with the first request may be performed (e.g., if the first request is a request to perform a search based upon a query then the search may be performed, if the first request is a request to access data in a cloud-storage then access to the data may be provided, if the first request is a request to transmit an email then the email may be transmitted, if the first request is an authentication request then the first request may be authenticated, if the first request is a request to generate a user account then the user account may be generated, etc.).

Alternatively and/or additionally, responsive to a determination that the first counter value (e.g., 736) is greater than the threshold counter value (e.g., 693), the one or more operations (e.g., the one or more requested services) may not be performed. For example, the first server may prohibit the one or more operations from being performed and/or may throttle the one or more operations. Alternatively and/or additionally, responsive to the determination that the first counter value is greater than the threshold counter value, an error message (e.g., the error message may comprise an error code) may be transmitted to the first client device. For example, the error message may be indicative of the first counter value being greater than the threshold counter value.

In some examples, the threshold counter value may be based upon the user information and/or the client device information of the first database (e.g., the threshold counter value may be calculated, generated, determined, etc. based upon the user information and/or the client device information). For example, the threshold counter value may be determined based upon the first location. For example, the first set of locations may be associated with a threshold counter value that is less than a threshold counter value of the second set of locations (e.g., such that client devices in the first set of locations may have a lower throttle/traffic limit than client devices in the second set of locations). Alternatively and/or additionally, the threshold counter value may be based upon the IP address and/or different information associated with the first client device. For example, if the first client device and/or the IP address are determined to be blacklisted and/or suspicious, the threshold counter value may be less than if the first client device and/or the IP address are determined to not be blacklisted and/or not suspicious. In some examples, the first counter value may be reset (e.g., set to zero, set to a reset value, etc.) periodically (e.g., once per day, once per week, etc.).

At 406, one or more first data packets (e.g., increment commands) may be transmitted to one or more first servers of a first plurality of servers. For example, the first plurality of servers may comprise each server of the cluster of servers, excluding the first server. In some examples, each data packet of the one or more first data packets may comprise an instruction for a server of the one or more first servers to increment a counter value associated with the first client device by a second number. In some examples, the second number may be equal to a combination of the first number, a third number and/or a fourth number. For example, the third number may be equal to a first quantity of servers (e.g., 99, 48, 12, etc.) of the first plurality of servers (e.g., the third number may be equal to a second quantity of servers of the cluster of servers (e.g., 100, 49, 13, etc.) subtracted by one). Alternatively and/or additionally, the fourth number may be equal to a third quantity of servers (e.g., 2, 3, 4, 8, 20, etc.) of the one or more first servers.

In some examples, the second number may be determined by performing an operation (e.g., a mathematical operation) using the first number, the third number and/or the fourth number. For example, the second number may be equal to a product of the first number and the third number divided by the fourth number (e.g., in an instance where the first number is one, the third number is 48 and the fourth number is three, the second number may be $$\frac{1 \times 99}{3} = 33 \Bigg).$$

For example, the product of the first number and the third number may be determined. Then, the product may be divided by the fourth number. Alternatively and/or additionally, the third number may be divided by the fourth number to determine a fifth number. Then, the first number may be multiplied by the fifth number to determine the second number. Alternatively and/or additionally, the first number may be divided by the fourth number to determine a sixth number. Then, the third number may be multiplied by the sixth number to determine the second number. Alternatively and/or additionally, if the first number is equal to one, the second number may be determined by merely dividing the third number by the fourth number $$\left(\text{e.g.,}\ \frac{99}{3}=33\right).$$

In some examples, the one or more first data packets may comprise one or more indications of the second number (e.g., an indication of the second number may be included in each data packet of the one or more first data packets). Alternatively and/or additionally, responsive to the one or more first servers receiving the one or more first data packets, one or more operations may be applied, by each server of the one or more first servers, to the first number, the third number and/or the fourth number to determine the second number. Alternatively and/or additionally, the one or more first servers (and/or other servers of the cluster of servers) may comprise indications of the second number within memory structures that may be retrieved and/or used to increment counter values upon receipt of data packets (e.g., increment commands).

In some examples, the one or more first servers may comprise each server of the first plurality of servers. For example, the first quantity of servers (e.g., 99) of the first plurality of servers may be equal to the third quantity of servers (e.g., 99) of the one or more first servers and/or the second number may be equal to the first number. Alternatively and/or additionally, the one or more first servers may be a subset of the first plurality of servers. For example, the first plurality of servers may comprise one or more second servers different than the one or more first servers and/or the first quantity of servers of the first plurality of servers may be different than the third quantity of servers of the one or more first servers (and/or the second number may be different than the first number).

In some examples, the one or more first servers may be selected as recipients of the one or more first data packets from the first plurality of servers randomly. For example, the one or more first servers may be selected as recipients of the one or more first data packets from the first plurality of servers based upon a random selection function (e.g., the one or more first servers may be selected using random number generation, random sampling, random unique set generation, random continuous range, etc.). Alternatively and/or additionally, the one or more first servers may be selected as recipients of the one or more first data packets from the first plurality of servers using a round robin function. Alternatively and/or additionally, the one or more first servers may be selected as recipients of the one or more first data packets from the first plurality of servers using one or more different selection techniques.

In some examples, the one or more first data packets may be generated and/or transmitted in accordance with user datagram protocol (UDP). It may be appreciated that using UDP for generation and/or transmission of the one or more first data packets may lead to benefits including, but not limited to, less overhead as a result of a lack of protocol stack processing, a lack of handshaking dialogues, a lack of retransmission, etc. Alternatively and/or additionally, the one or more first data packets may be transmitted by broadcasting (e.g., multicasting) the one or more first data packets to the one or more first servers. Alternatively and/or additionally, the one or more first data packets may be generated and/or transmitted in accordance with transmission control protocol (TCP) and/or a different data protocol.

In some examples, a third server of the one or more first servers may receive a second data packet of the one or more first data packets. Responsive to receiving the second data packet from the first server, a second counter value associated with the first client device may be incremented by the second number. Alternatively and/or additionally, the second counter value may be decremented based upon a comparison of a fourth timestamp and a third time that the second data packet is received. The fourth timestamp may be associated with a third request for a service (e.g., authentication request, etc.) that was received from the first client device prior to receiving the second data packet (e.g., the fourth timestamp may be comprised within the third request, the fourth timestamp may be generated responsive to receiving the third request, etc.). Alternatively and/or additionally, the fourth timestamp may be associated with a third data packet received from a fourth server of the cluster of servers comprising an instruction for the third server to increment the second counter value (e.g., the third data packet may be received prior to receiving the second data packet).

The third time may be determined based upon a fifth timestamp (e.g., the fifth timestamp may be generated responsive to receiving the second data packet, the fifth timestamp may be comprised within the second data packet, etc.). For example, the second counter value may be decremented based upon the exponential decay function, the linear decay function and/or a different decay function. For example, the exponential decay function, the linear decay function and/or a different decay function may be applied to (a combination of) a fourth time associated with the fifth timestamp and the third time to calculate a second decrement number (e.g., the second counter value may be decremented by decreasing the second counter value by the second decrement number). For example, the second counter value may be decremented based upon a difference in time between the third time and the fourth time.

Alternatively and/or additionally, the first server may receive a fourth data packet, associated with the first client device, from a fifth server of the cluster of servers. For example, responsive to receiving a fourth request from the first client device, the fifth server may transmit one or more second data packets to one or more third servers, comprising the first server (e.g., the one or more third servers may be selected using a random selection function, using a round robin function, etc.). The fourth data packet may comprise an instruction to increment the first counter value by the second number (and/or a different number). In some examples, responsive to receiving the fourth data packet, the first counter value may be incremented by the second number. In an example, if the first counter value is equal to 237 upon receipt of the fourth data packet and/or if the second number is equal to 49.5, then the first counter value may be incremented to 286.5.

In some examples, a plurality of counter values (comprising the first counter value and/or the second counter value) may be maintained based upon a plurality of sets of instructions transmitted to servers of the cluster of servers. For example, each set of instructions of the plurality of sets of instructions may be transmitted to a server of the cluster of servers. For example, (updated) versions of the plurality of sets of instructions may be transmitted to the cluster of servers periodically (e.g., daily, weekly, during synchronization procedures, during update maintenance, etc.). In some examples, sets of instructions of the plurality of sets of instructions may be similar to each other (e.g., values, instructions, etc. of the plurality of sets of instructions may be the same) which may cause the plurality of sets of servers to become synchronized with each other such that differences between counter values, associated with the first client device, maintained by servers of the cluster of servers are minimal.

For example, a first set of instructions of the plurality of sets of instructions may be transmitted to the first server. For example, the first set of instructions may be received by the first server prior to receiving the first request. The first set of instructions may comprise one or more first instructions associated with the first number (that the first counter value is incremented by responsive to receiving the first request). For example, the one or more first instructions may comprise a request incrementing value corresponding to the first number. For example, each instance that a request is received from a client device, a counter value associated with the client device may be incremented by the request incrementing value.

Alternatively and/or additionally, the one or more first instructions may comprise a plurality of request incrementing values. For example, each request incrementing value of the plurality of request incrementing values may be associated with a set of conditions of a plurality of sets of conditions. For example, each set of conditions of the plurality of sets of conditions may be associated with a location, a blacklisted state, a suspicious state, a time of day, a type of device, etc. For example, responsive to receiving a fifth request, from a third client device, having a first set of conditions of the plurality of sets of conditions (e.g., the first set of conditions may correspond to the third client device being associated with a second location, the third client device being blacklisted and/or suspicious, the fifth request being transmitted during a second time of day, etc.), a second request incrementing value associated with the first set of conditions may be selected and/or a third counter value associated with the third client device may be incremented by the second request incrementing value. Alternatively and/or additionally, responsive to receiving a sixth request, from a fourth client device, having a second set of conditions of the plurality of sets of conditions (e.g., the second set of conditions may correspond to the fourth client device being associated with a third location, the fourth client device not being blacklisted and/or suspicious, the sixth request being transmitted during a third time of day, etc.), a third request incrementing value associated with the second set of conditions may be selected and/or a fourth counter value associated with the fourth client device may be incremented by the third request incrementing value. The third request incrementing value may be different than the second request incrementing value.

Alternatively and/or additionally, the first set of instructions may comprise one or more second instructions associated with the first decrement number (that the first counter value is decremented by based upon the first timestamp and/or the first time that the first request is received). For example, the one or more second instructions may comprise instructions for performing the exponential decay function, the linear decay function and/or a different decay function. Alternatively and/or additionally, the one or more second instructions may comprise a second plurality of sets of instructions. For example, each set of instructions of the second plurality of sets of instructions is associated with a set of conditions of the plurality of sets of conditions. Alternatively and/or additionally, each set of instructions of the second plurality of instructions may comprise instructions for performing a version of a decay function (e.g., a version of the exponential decay function, a version of the linear decay function and/or a version of the different decay function) of a plurality of versions of the decay function. For example, each version of the decay function of the plurality of versions of the decay function may be associated with a set of conditions of the plurality of sets of conditions (e.g., each version of the decay function of the plurality of versions of the decay function may have constants associated with the set of conditions that may control decrement numbers that counter values are decremented by).

Alternatively and/or additionally, the first set of instructions may comprise one or more third instructions associated with selecting the one or more first servers as recipients of the one or more first data packets. For example, the first set of instructions may comprise an indication of the third quantity of servers to be selected as recipients of data packets (e.g., increment commands). For example, for each instance that a request is received by the first server and/or a counter value associated with the request is incremented, the first server may select one or more servers having the third quantity of servers (e.g., a quantity of servers of the one or more servers may be equal to the second quantity of servers) and/or may transmit one or more data packets (e.g., increment commands) to the one or more servers. Alternatively and/or additionally, the one or more third instructions may comprise instructions for techniques to be used for selecting one or more servers as recipients of data packets (e.g., random selection function, random number generation, random sampling, random continuous range, round robin, etc.).

The one or more third instructions may comprise instructions for generating and/or transmitting data packets (e.g., increment commands) to servers. For example, the one or more third instructions may comprise an indication of a protocol to be implemented during data packet generation and/or transmission (TCP, UDP, etc.). Alternatively and/or additionally, the one or more third instructions may comprise indications of items to be included within the data packets (e.g., whether the data packets should include an identifier of the first server, whether the data packets should include an indication of an increment number (such as the second number), etc.).

Alternatively and/or additionally, the first set of instructions may comprise one or more fourth instructions corresponding to the cluster of servers. For example, the one or more fourth instructions may comprise indications of one or more additional servers being added to the cluster of servers. For example, the indications of the one or more additional servers may comprise one or more server identifiers associated with the one or more additional servers. For example, responsive to receiving the first set of instructions, the first server may store the one or more server identifiers in a second database (e.g., the one or more server identifiers may be added to the second database). The second database may comprise a second list, a second array, a second table, and/or a second cache in which a plurality of sets of server identifiers associated with the cluster of servers (e.g., excluding the first server) are stored. For example, each set of server identifiers of the plurality of sets of server identifiers may comprise a network address associated with a server of the cluster of servers, a unique identifier associated with the server, etc. In some examples, the one or more fourth instructions may comprise an indication of the second quantity of servers of the cluster of servers. Alternatively and/or additionally, the second quantity of servers of the cluster of servers may be determined (by the first server) by analyzing the second database.

Alternatively and/or additionally, the first set of instructions may comprise one or more fifth instructions corresponding to a determination of the second number. For example, the one or more fifth instructions may comprise an indication of the second number. Alternatively and/or additionally, the one or more fifth instructions may comprise one or more indications of operations to be applied in determining the second number.

In some examples, the first counter value may be associated with a token-based counter technique (e.g., the cluster of servers may use the token-based counter technique to monitor levels of activity of client devices), where, rather than incrementing the first counter value by the first number upon receipt of the first request, the first counter value may be decremented by the first number. Alternatively and/or additionally, the one or more first data packets may comprise instructions for the one or more first servers to decrement counter values associated with the first client device by the second number (e.g., rather than increment the counter values associated with the first client device by the second number). Alternatively and/or additionally, the threshold counter value may be associated with a minimum counter value of the first counter value (e.g., the threshold counter value may be zero and/or a different number) such that responsive to a determination that the first counter value exceeds the threshold counter value, one or more requested services associated with the first request may be performed. Alternatively and/or additionally, responsive to a determination that the first counter value is less than or equal to the threshold counter value, the one or more requested services may not be performed.

It may be appreciated that some methods attempt to implement the decentralized network architecture, such as the peer-to-peer network architecture, in order to use a decentralized approach to determining levels of activity associated with client devices. For example, responsive to receiving an exemplary request from an exemplary client device, an exemplary server may increment an exemplary counter value (associated with the exemplary client device) by an exemplary number and may transmit exemplary data packets (e.g., increment commands) to an exemplary subset of servers of the cluster of servers comprising instructions to increment exemplary counter values associated with the exemplary client device by the exemplary number. However, those methods may still have a problem (e.g., an over-counting problem) when there is an uneven distribution of requests transmitted by the exemplary client device to the cluster of servers, which may be caused by the exemplary server incrementing the exemplary counter value by the same number as the exemplary subset of servers. For example, if the exemplary client device transmits more requests to the exemplary server than to other servers of the cluster of servers, then the exemplary counter value may be indicative of an exemplary level of activity of the exemplary client device that is higher than an actual level of activity of the exemplary client device. This may cause the exemplary server to throttle the exemplary client device based upon the exemplary counter value that is inaccurate.

However, by using one or more of the techniques provided herein (e.g., by incrementing the exemplary counter value by the first number, which may be one and/or by transmitting the data packets comprising instructions for the exemplary subset of servers to increment the counter values by the second number, which may be a combination of the first number, the third number and/or the fourth number), the exemplary counter value may be indicative of the actual level of activity of the exemplary client device (e.g., thus mitigating and/or preventing over-counting), even when there is an uneven distribution of requests transmitted by the exemplary client device to the cluster of servers. For example, even if the exemplary client device transmits more requests to the exemplary server than to other servers of the cluster of servers, the exemplary counter value of the exemplary server may be indicative of the actual level of activity of the exemplary client device (e.g., each server of the cluster of servers may have a counter value associated with the exemplary client device that are approximately equal to each other).

Figure 4B:
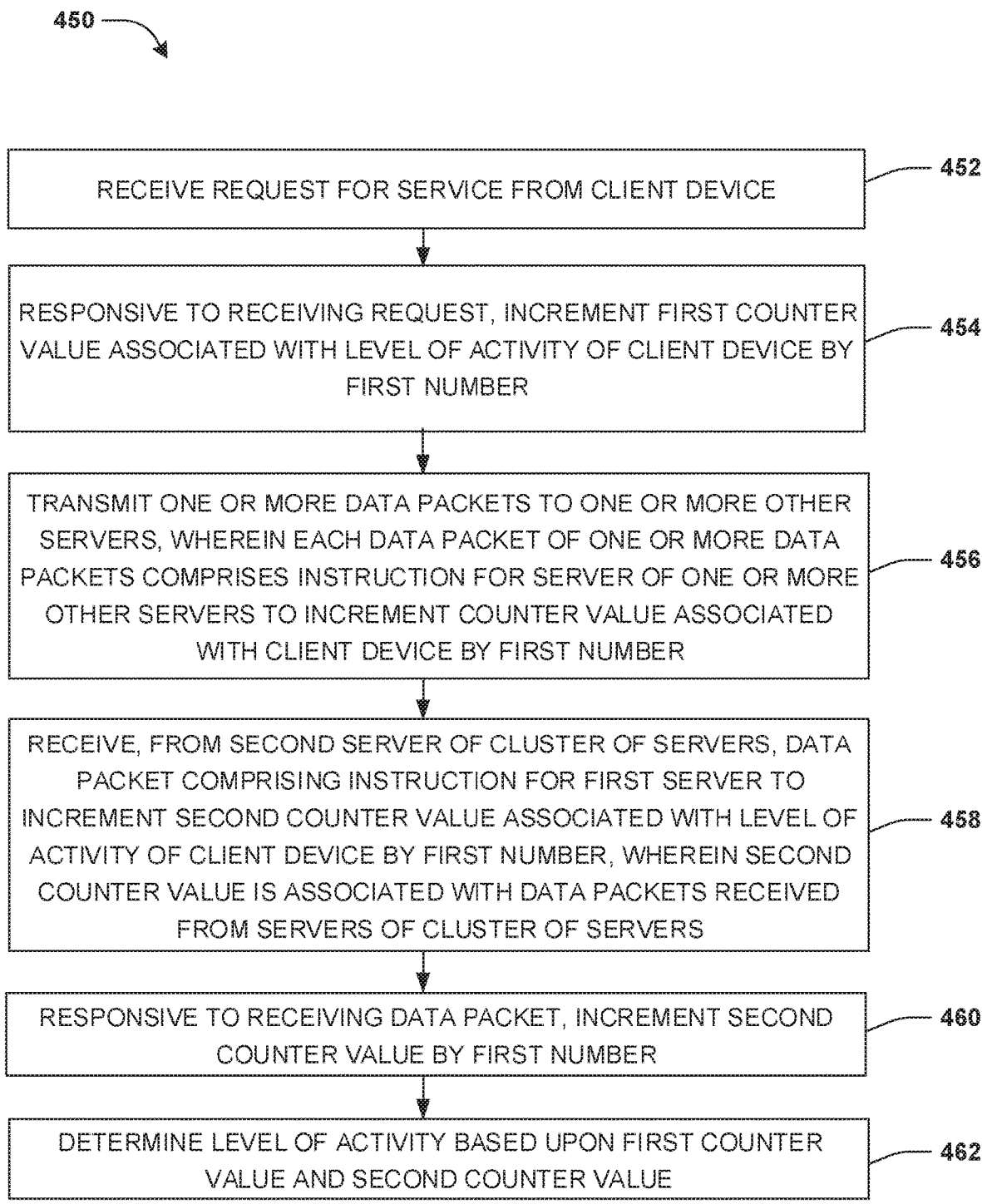
FIG. 4B is a flow chart illustrating an example method for monitoring levels of activity of client devices.

An embodiment of monitoring levels of activity of client devices is illustrated by an example method 450 of FIG. 4B. A system may perform one or more services, such as provide client devices with access to resources, provide content to the client devices, receive and/or upload content and/or data, etc. The system may be associated with a service such as an email service, a messaging service, a social network service, a bank account service, a web browsing service, a web searching service, a web gaming service, an electronic commerce service, a content (e.g., audio, video, images, etc.) service, etc. Levels of activity associated with client devices using the system may be determined in order to detect whether activity of a client device is malicious activity (e.g., spamming, denial of service attacks, hacking attacks, etc.) and/or for a different purpose. For example, a cluster of servers associated with the system may receive requests for services (e.g., authentication requests, requests for content, etc.) from client devices. For example, servers of the cluster of servers may share information associated with levels of activity of client devices with other servers of the cluster of servers.

At 452, a first request for a service may be received by a first server from a first client device. In some examples, the first server may be a part of the cluster of servers. The first request may be an authentication request, a request for content, a request to transmit an email, a request to access one or more resources, etc. Alternatively and/or additionally, the first request may be received from the first client device via a network connection. For example, the first request may be received via a system interface (e.g., a webpage interface, an application, an email interface, a messaging interface, etc.) associated with the system.

At 454, responsive to receiving the first request, a first counter value associated with a first level of activity of the first client device may be incremented by a first number. In some examples, the first counter value may be associated with requests received (by the first server) from the first client device. For example, the first counter value may be incremented each instance that a request for a service is received from the first client device.

In some examples, a first set of counter values, associated with the first client device, may be stored within a first database of the first server. For example, the first set of counter values may be stored within a first list, a first array, a first table (e.g., a first hash table) and/or a first cache of the first database. The first database may comprise information associated with the user and/or the first client device. For example, the first database may comprise user information and/or client device information (e.g., device identification information, an IP address, etc.). Alternatively and/or additionally, one or more client identifiers associated with the first client device may be stored in the first database. For example, the one or more client identifiers may comprise an indication of a first location corresponding to the first client device, the IP address associated with the first client device, the device identification information, etc.

In some examples, the first set of counter values may comprise the first counter value and/or a second counter value associated with the first client device. For example, the second counter value may be associated with data packets (e.g., increment commands), corresponding to the first client device, received from servers of the cluster of servers. For example, responsive to receiving a data packet (e.g., an increment command) corresponding to the first client device from a server of the cluster of servers, the second counter value may be incremented (rather than incrementing the first counter value).

Alternatively and/or additionally, the first database may comprise temporal information associated with the first client device. For example, the temporal information may comprise one or more timestamps. The one or more timestamps may be associated with times that one or more requests are received from the first client device. Alternatively and/or additionally, the one or more timestamps may be associated with times that one or more data packets corresponding to the first client device are received from servers of the cluster of servers. Alternatively and/or additionally, the one or more timestamps may be associated with times that the first counter value was modified (e.g., incremented, decremented, etc.) and/or with times that the second counter value was modified (e.g., incremented, decremented, etc.).

In some examples, the first number may be equal to a combination of a second number and a third number. For example, the second number may be equal to a first quantity of servers of the cluster of servers. Alternatively and/or additionally, the third number may be equal to a second quantity of servers of a first plurality of servers, of the cluster of servers. The first plurality of servers may comprise the first server and/or one or more first servers (different than the first server) of the cluster of servers.

In some examples, the first number may be determined by performing an operation (e.g., a mathematical operation) using the second number and/or the third number. For example, the first number may be equal to the second number divided by the third number. Alternatively and/or additionally, the first number may be equal to a product of the second number and a fourth number, divided by the third number. For example, the fourth number may be a weight applied to the first number based upon the user information and/or the client device information device information of the first database. For example, if the location, the first client device and/or the IP address are determined to be blacklisted and/or suspicious, the fourth number may be greater than if the location, the first client device and/or the IP address are determined to not be blacklisted and/or not suspicious. Alternatively and/or additionally, the first number may be stored within the first server (e.g., in the first database and/or in a different database) and/or may be used to increment the first counter value by the first number responsive to receiving the first request.

At 456, one or more first data packets may be transmitted to the one or more first servers (by the first server). For example, each data packet of the one or more first data packets may comprise an instruction for a server of the one or more first servers to increment a counter value associated with the client device by the first number (and/or a different number). In some examples, the one or more first servers may be selected as recipients of the one or more first data packets from the cluster of servers randomly. For example, the one or more first servers may be selected as recipients of the one or more first data packets from the first plurality of servers based upon a random selection function (e.g., the one or more first servers may be selected using random number generation, random sampling, random unique set generation, random continuous range, etc.). Alternatively and/or additionally, the one or more first servers may be selected as recipients of the one or more first data packets from the first plurality of servers using a round robin function. Alternatively and/or additionally, the one or more first servers may be selected as recipients of the one or more first data packets from the first plurality of servers using one or more different selection techniques.

In some examples, a second server of the one or more first servers may receive a second data packet of the one or more first data packets. A second set of counter values, associated with the first client device, may be stored within a second database of the second server. For example, the second set of counter values may comprise a third counter value and/or a fourth counter value associated with the first client device. For example, the third counter value may be associated with requests received (by the second server) from the first client device. For example, the third counter value may be incremented each instance that a request for a service is received from the first client device. Alternatively and/or additionally, the fourth counter value may be associated with data packets, corresponding to the first client device, received from servers of the cluster of servers. For example, responsive to receiving the second data packet from the first server, the fourth counter value may be incremented by the first number (and/or a different number). For example, the third counter value may not be incremented based upon the second data packet.

At 458, a third data packet may be received from a third server of the cluster of servers. For example, the third data packet may comprise an instruction for the first server to increment the second counter value. For example, the third server may receive a second request from the first client device. A third set of counter values, associated with the first client device, may be stored within a third database of the third server. For example, the third set of counter values may comprise a fifth counter value and/or a sixth counter value associated with the first client device. For example, the fifth counter value may be associated with requests received from the first client device. Accordingly, responsive to the third server receiving the second request, the fifth counter value may be incremented (by the first number). Alternatively and/or additionally, responsive to the third server receiving the second request, one or more second data packets (comprising the third data packet) may be transmitted to one or more second servers (comprising the first server).

At 460, responsive to receiving the third data packet, the second counter value may be incremented by the first number (and/or a different number). For example, the first counter value may not be incremented based upon reception of the third data packet. At 462, the first level of activity (associated with the first client device) may be determined based upon the first counter value and the second counter value. For example, the first level of activity may be a combination of the first counter value and the second counter value. For example, the first level of activity may be determined by performing an operation (e.g., a mathematical operation comprising addition, subtraction, multiplication, division, etc.) using the first counter value and/or the second counter value. For example, the first level of activity may be equal to a sum of the first counter value and the second counter value.

Alternatively and/or additionally, the first level of activity may be determined based upon the first counter value, a first weight corresponding to the first counter value, the second counter value and/or a second weight corresponding to the second counter value. For example, a relationship between the first counter value and the second counter value may be determined. For example, a quotient may be determined based upon the first counter value and the second counter value. Alternatively and/or additionally, a ratio, a proportion, a difference, a percentage, and/or a different type of relationship between the first counter value and the second counter value may be determined. For example, the quotient may be determined by dividing the first counter value by the second counter value (and/or by dividing the second counter value by the first counter value).

In some examples, the quotient (and/or the ratio, the proportion, etc.) may be compared with an expected quotient (and/or an expected ratio, an expected proportion, etc.) to determine a difference between the quotient and the expected quotient. Alternatively and/or additionally, the quotient may be compared with the expected quotient to determine a second quotient, a second ratio, a second proportion, a second percentage, and/or a different type of relationship associated with the quotient and the expected quotient. For example, responsive to a determination that the difference between the quotient and the expected quotient is greater than a threshold difference, the first weight may be applied to the first counter value to generate a first weighted counter value. Alternatively and/or additionally, responsive to the determination that the difference between the quotient and the expected quotient is greater than the threshold difference, the second weight may be applied to the second counter value to generate a second weighted counter value. For example, the first level of activity may be equal to a sum (e.g., and/or a different type of combination) of the first weighted counter value and the second weighted counter value.

In some examples, the expected quotient may be equal to one (and/or a different number). In some examples, the quotient (and/or the ratio, the proportion, etc.) may be indicative of a distribution of requests transmitted by the first client device to the cluster of servers. For example, if there is an even distribution of requests transmitted by the first client device to servers of the cluster of servers, where each server of the cluster of servers receives a similar quantity of requests from the first client device during a first period of time, then the quotient may be equal to approximately one and/or to the expected quotient (and/or the ratio may be approximately 1:1, the difference may be equal to approximately zero, the proportion may be approximately 100%, etc.) (and/or a different value). Alternatively and/or additionally, if the first server receives a third quantity of requests from the first client device during the first period of time and/or if the third quantity is similar to an average quantity of requests received by other servers of the cluster of servers from the first client device during the first period of time, then the quotient may be equal to approximately one and/or to the expected quotient (e.g., the other servers of the cluster of servers may comprise every server of the cluster of servers excluding the first server). The average quantity of requests may be equal to a fourth quantity of requests of a plurality of requests received by the other servers, during the first period of time, divided by a fifth quantity of servers of the other servers (e.g., the fifth quantity of servers may be equal to the first quantity of servers of the cluster of servers subtracted by one).

Alternatively and/or additionally, if there is an uneven distribution of requests transmitted by the first client device to servers of the cluster of servers, where one server may receive more requests from the first client device than another server of the cluster of servers and/or where the third quantity of requests received from the first client device during the first period of time is greater than the average quantity of requests received by the other servers of the cluster of servers, then the quotient may be greater than (and/or less than) one and/or the expected quotient. Alternatively and/or additionally, if the third quantity of requests received from the first client device during the first period of time is less than the average quantity of requests received by the other servers of the cluster of servers, then the quotient may be less than (and/or greater than) one and/or the expected quotient.

In some examples, the first weight and/or the second weight may be determined based upon the quotient and/or the expected quotient. For example, the first weight and/or the second weight may be determined such that by applying the first weight and/or the second weight to determine the first level of activity, the first level of activity is an accurate representation of a second average quantity of requests received by servers of the cluster of servers from the first client device (even in instances where the first server may receive more and/or less requests than the average quantity of requests received by the other servers). For example, in an instance where the first counter value is greater than the second counter value (and/or the quotient is greater than the expected quotient), the first weight may be less than the second weight (e.g., the first weight may be less than or equal to one and/or the second weight may be greater than or equal to one). Alternatively and/or additionally, in an instance where the first counter value is less than the second counter value (and/or the quotient is less than the expected quotient), the first weight may be greater than the second weight (e.g., the first weight may be greater than or equal to one and/or the second weight may be less than or equal to one).

Alternatively and/or additionally, rather than applying the first weight to the first counter value to generate the first weighted counter value and/or the second weight to the second counter value to generate the second weighted counter value, the first counter value may be combined with the second counter value to generate a combined counter value (e.g., the combined counter value may be equal to the first counter value added to the second counter value). A third weight may be applied to the combined counter value to determine the first level of activity. For example, the third weight may be multiplied by the combined counter value to determine the first level of activity. For example, the third weight may be determined based upon the quotient and/or the expected quotient. For example, in an instance where the first counter value is greater than the second counter value (and/or the quotient is greater than the expected quotient), the third weight may be less than one (and/or a different number). Alternatively and/or additionally, in an instance where the first counter value is less than the second counter value (and/or the quotient is less than the expected quotient), the third weight may be greater than one.

In some examples, the first level of activity may be used to determine whether to perform requested services responsive to receiving requests from the first client device. For example, the first server may receive a third request from the first client device. The first counter value may be incremented (by the first number) and/or the first level of activity may be determined. Responsive to a determination that the first level of activity is greater than a threshold level of activity (e.g., a threshold counter value), the first server may not perform a requested service associated with the third request. Alternatively and/or additionally, responsive to a determination that the first level of activity is less than the threshold level of activity, the first server may perform the requested service associated with the third request. In some examples, the first level of activity and/or the threshold level of activity may be numbers (e.g., integers, decimal numbers, etc.).

In some examples, the first level of activity, the first counter value and/or the second counter value may be decremented. For example, the first level of activity, the first counter value and/or the second counter value may be decremented based upon a first time associated with the third request and/or a second time comprised within the temporal information of the first database. For example, the second time may be associated with the first server receiving a request from the first client device, the second time may be associated with the first server receiving a data packet corresponding to the first client device from a server of the cluster of servers, etc. For example, the first level of activity, the first counter value and/or the second counter value may be decremented based upon an exponential decay function, a linear decay function and/or a different decay function.

FIGS. 5A-5E illustrate examples of a system 501 for monitoring levels of activity of client devices. The system 501 may be an exemplary implementation of one or more techniques illustrated in method 400. The system 501 may perform one or more services and/or may provide client devices, such as a first client device 500, with access to resources. For example, the system 501 may be associated with a content service (e.g., a news content service). A level of activity associated with the first client device 500 may be determined in order to detect whether activity of the first client device 500 is malicious activity (e.g., spamming, denial of service attacks, hacking attacks, etc.) and/or for a different purpose.

Figure 5A:
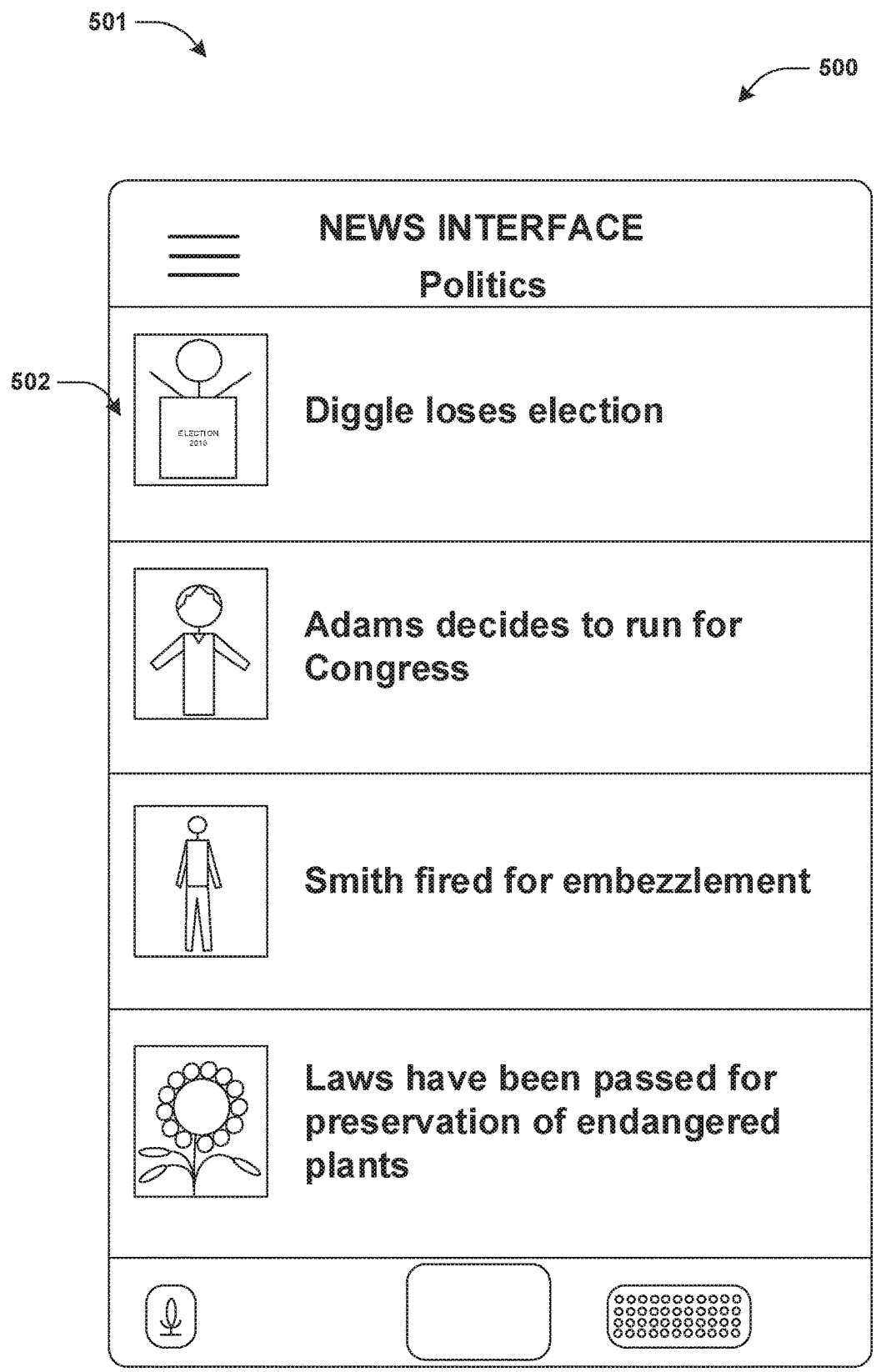
FIG. 5A is a component block diagram illustrating an example system for monitoring levels of activity of client devices, where a graphical user interface of a client device is controlled to display a system interface.

FIG. 5A illustrates a graphical user interface of the first client device 500 being controlled to display a system interface associated with the system 501. For example, the system interface may comprise a plurality of selectable inputs (e.g., the plurality of selectable inputs may correspond to news articles of a list of news articles) comprising a first selectable input 502 corresponding to a first content item (e.g., a news article). For example, a selection of the first selectable input 502 may be received.

Figure 5B:
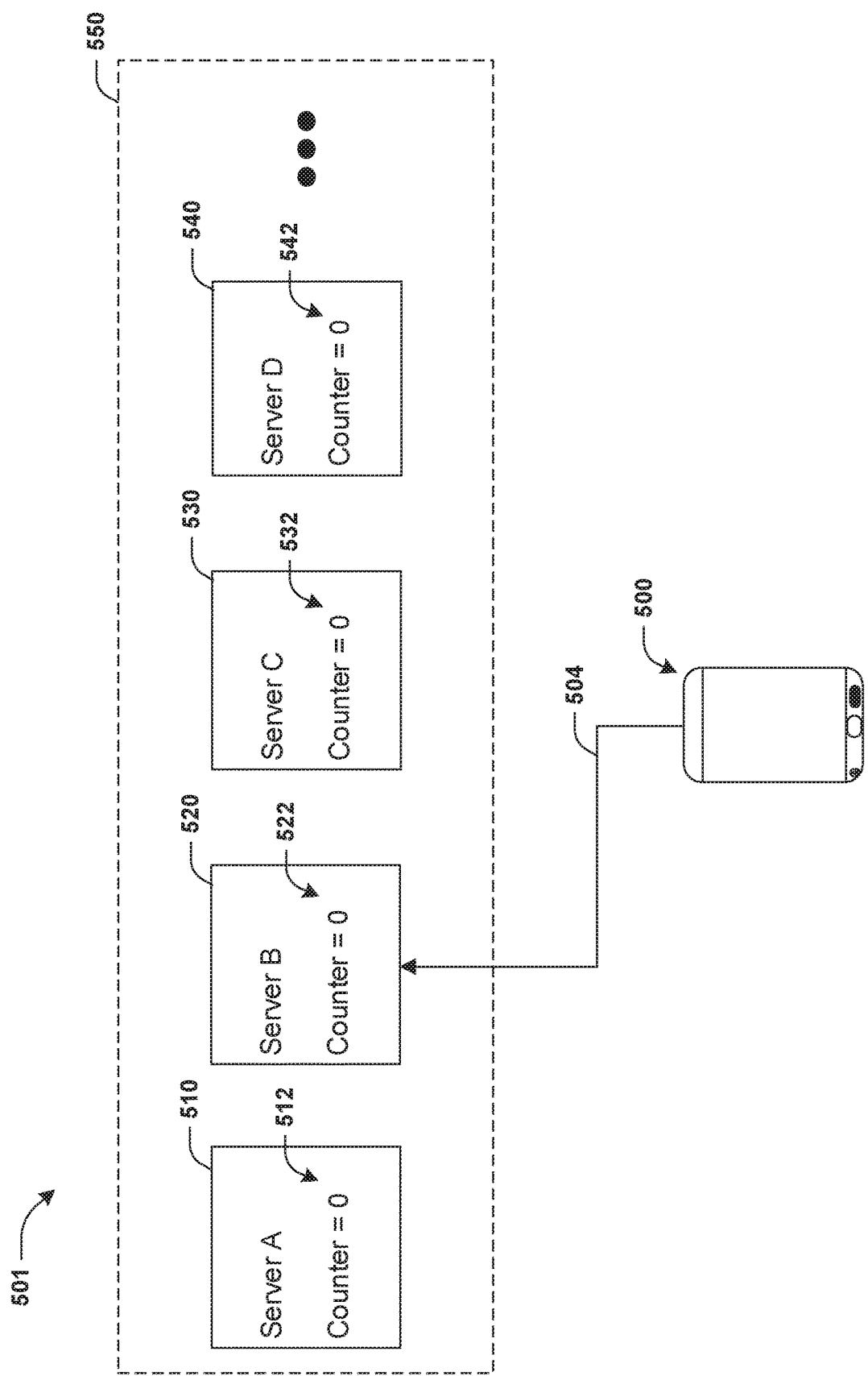
FIG. 5B is a component block diagram illustrating an example system for monitoring levels of activity of client devices, where a request is transmitted to a second server.

FIG. 5B illustrates a request 504 (for a service) being transmitted to a second server 520 ("Server B"). For example, the request 504 may be transmitted to the second server 520 by the first client device 500 responsive to the selection of the first selectable input 502. For example, the request 504 may be a request for content (e.g., a request to be provided with the first content item). Alternatively and/or additionally, the request 504 may be an authentication request. In some examples, the second server 520 may be a part of a cluster of servers 550. For example, the cluster of servers 550 may comprise 100 servers (and/or a different quantity of servers). For example, a first quantity of servers of the cluster of servers 550 may be 100. For example, the cluster of servers 550 may comprise a first server 510 ("Server A"), the second server 520, a third server 530 ("Server C"), a fourth server 540 ("Server D") and/or 96 other servers.

In some examples, each server of the cluster of servers 550 may have a counter value, associated with the first client device 500, stored within a database of the server. For example, a first counter value 512 associated with the level of activity of the first client device 500 may be stored in a first database of the first server 510. Alternatively and/or additionally, a second counter value 522 associated with the level of activity of the first client device 500 may be stored in a second database of the second server 520. Alternatively and/or additionally, a third counter value 532 associated with the level of activity of the first client device 500 may be stored in a third database of the third server 530. Alternatively and/or additionally, a fourth counter value 542 associated with the level of activity of the first client device 500 may be stored in a fourth database of the fourth server 540.

Figure 5C:
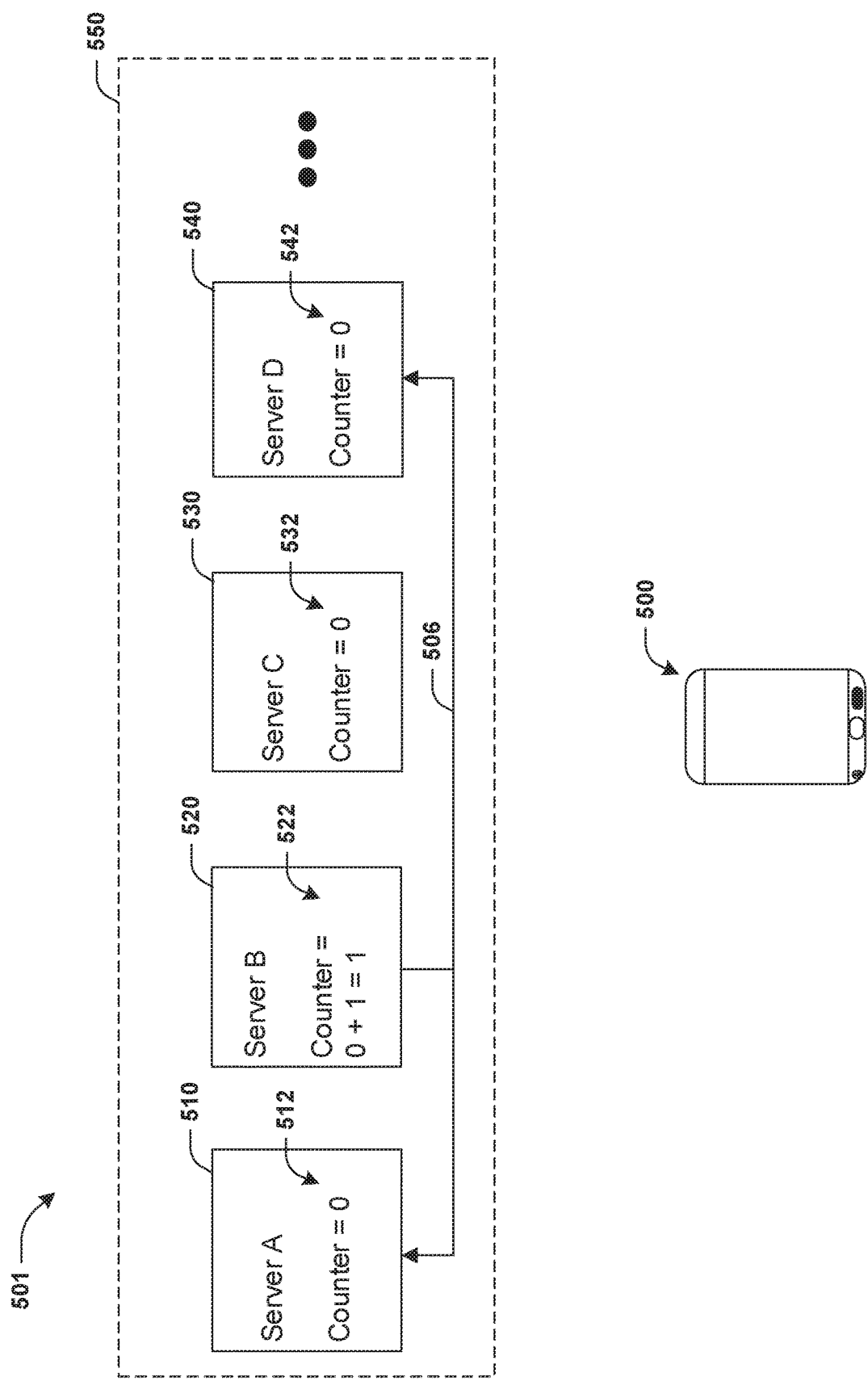
FIG. 5C is a component block diagram illustrating an example system for monitoring levels of activity of client devices, where a second counter value is incremented by a first number.

FIG. 5C illustrates the second counter value 522 being incremented by a first number. For example, the second counter value 522 may be incremented by the first number responsive to the second server 520 receiving the request 504. In some examples, the first number may be equal to one (and/or a different number). In some examples, the first counter value 522 may be incremented each instance that a request for a service is received from the first client device 500.

Alternatively and/or additionally, a first plurality of data packets 506 (e.g., increment commands) may be transmitted to a first plurality of servers. The first plurality of servers may comprise two servers (and/or a different quantity of servers). For example, a second quantity of servers of the first plurality of servers may be equal to two. For example, the first plurality of servers may comprise the first server 510 and/or the fourth server 540. In some examples, the first plurality of servers may be selected as recipients of the first plurality of data packets 506 from the cluster of servers 550 using a random selection function, a round robin function, etc. In some examples, each data packet of the first plurality of data packets 506 may comprise an instruction for a server of the first plurality of servers to increment a counter value associated with the first client device 500 by a second number.

In some examples, the second number may be equal to a combination of the first number, a third number and/or a fourth number. For example, the third number may be equal to the first quantity of servers of the cluster of servers 550 subtracted by one (e.g., the third number may be equal to 99). For example, the third number may be equal to a third quantity of servers of a second plurality of servers comprising each server of the cluster of servers 550 excluding the second server 520. Alternatively and/or additionally, the fourth number may be equal to the second quantity of servers of the first plurality of servers (e.g., the fourth number may be equal to two). In some examples, the second number may be equal to a product of the first number and the third number divided by the fourth number. For example, the second number may be equal to $$49.5 \left( \frac{1 \times 99}{2} = 49.5 \right).$$

Figure 5D:
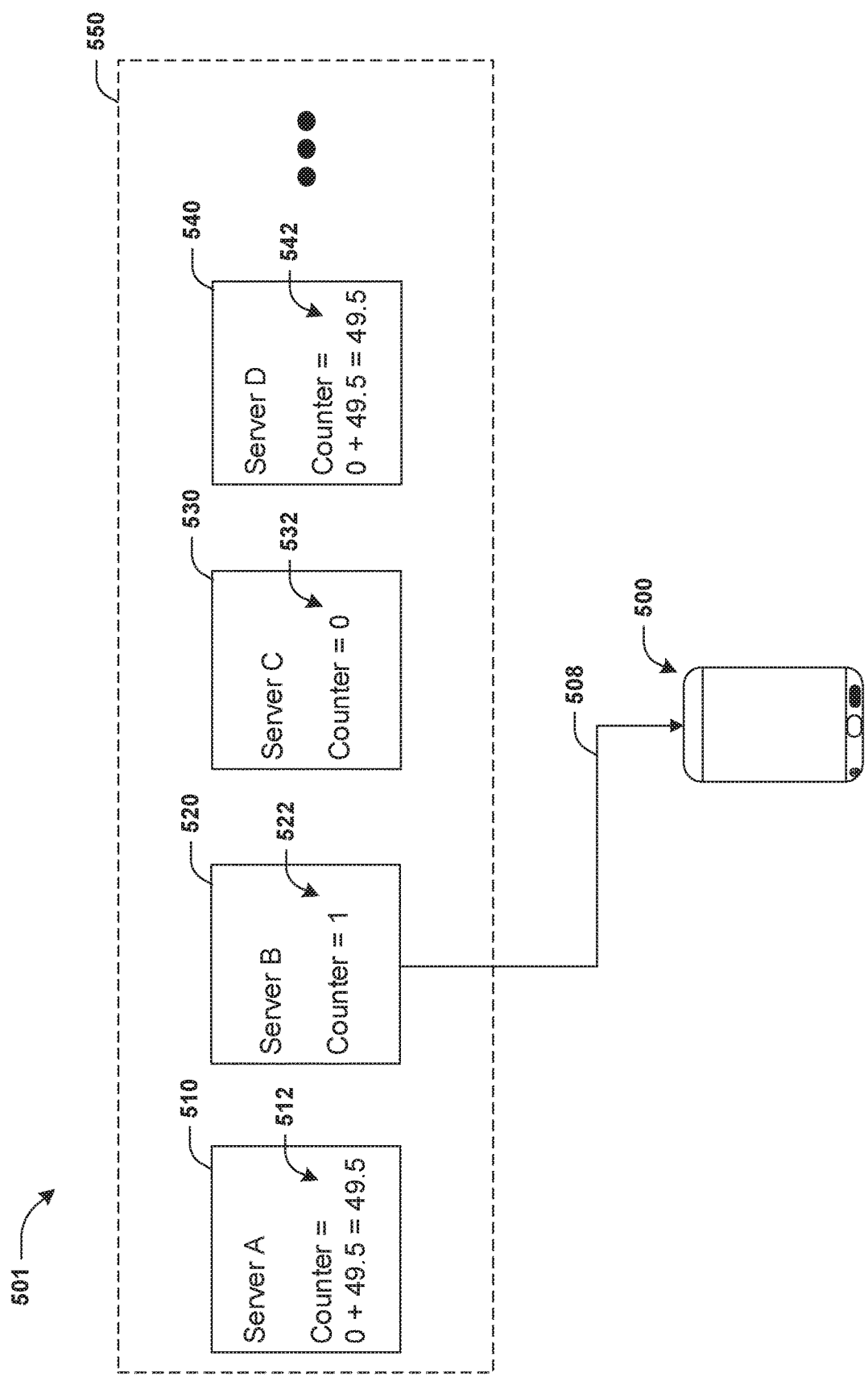
FIG. 5D is a component block diagram illustrating an example system for monitoring levels of activity of client devices, where a first counter value and/or a fourth counter value are incremented by a second number.

FIG. 5D illustrates the first counter value 512 and/or the fourth counter value 542 being incremented by the second number. For example, responsive to the first server 510 receiving a first data packet of the first plurality of data packets 506, the first counter value 512 may be incremented by the second number. Alternatively and/or additionally, responsive to the fourth server 540 receiving a second data packet of the first plurality of data packets 506, the fourth counter value 542 may be incremented by the second number.

Figure 5E:
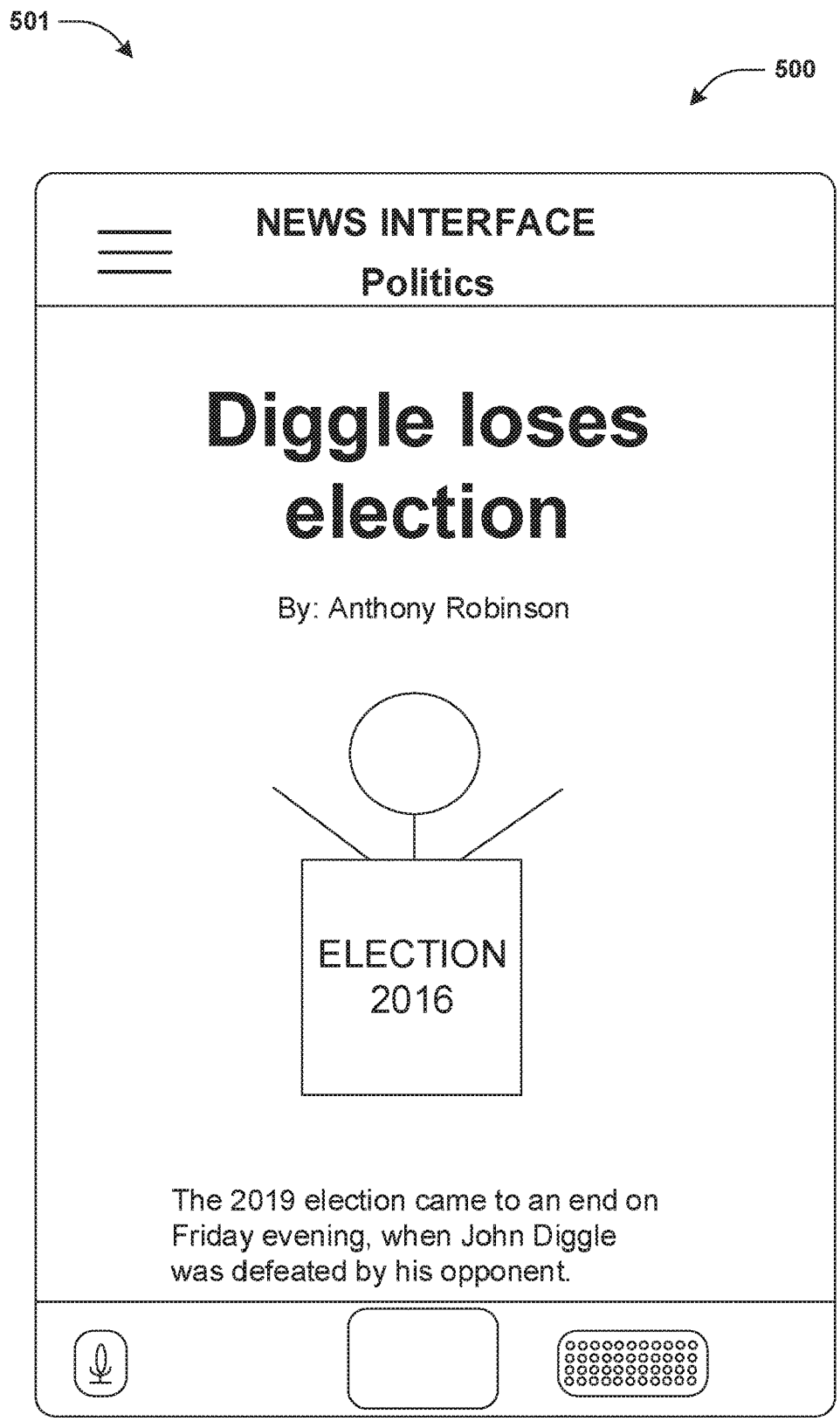
FIG. 5E is a component block diagram illustrating an example system for monitoring levels of activity of client devices, where a client device accesses a content item.

Alternatively and/or additionally, the second server 520 may compare the second counter value 522 with a threshold counter value. For example, responsive to a determination that the second counter value 522 is less than the threshold counter value (e.g., the threshold counter value may be 100, 200, 250.6, 1200, etc.), one or more requested services associated with the request 504 may be performed. For example, data 508 associated with the content item (e.g., the news article) may be transmitted to the first client device 500. Alternatively and/or additionally, access to the content item may be provided to the first client device 500. FIG. 5E illustrates the first client device 500 accessing the content item (e.g., the news article).

FIGS. 6A-6I illustrate examples of a system 601 for monitoring levels of activity of client devices. The system 601 may be an exemplary implementation of one or more techniques illustrated in method 450. The system 601 may perform one or more services and/or may provide client devices, such as a first client device 600, with access to resources. For example, the system 601 may be associated with a communication service (e.g., an email service). A level of activity associated with the first client device 600 may be determined in order to detect whether activity of the first client device 600 is malicious activity (e.g., spamming, denial of service attacks, hacking attacks, etc.) and/or for a different purpose.

Figure 6A:
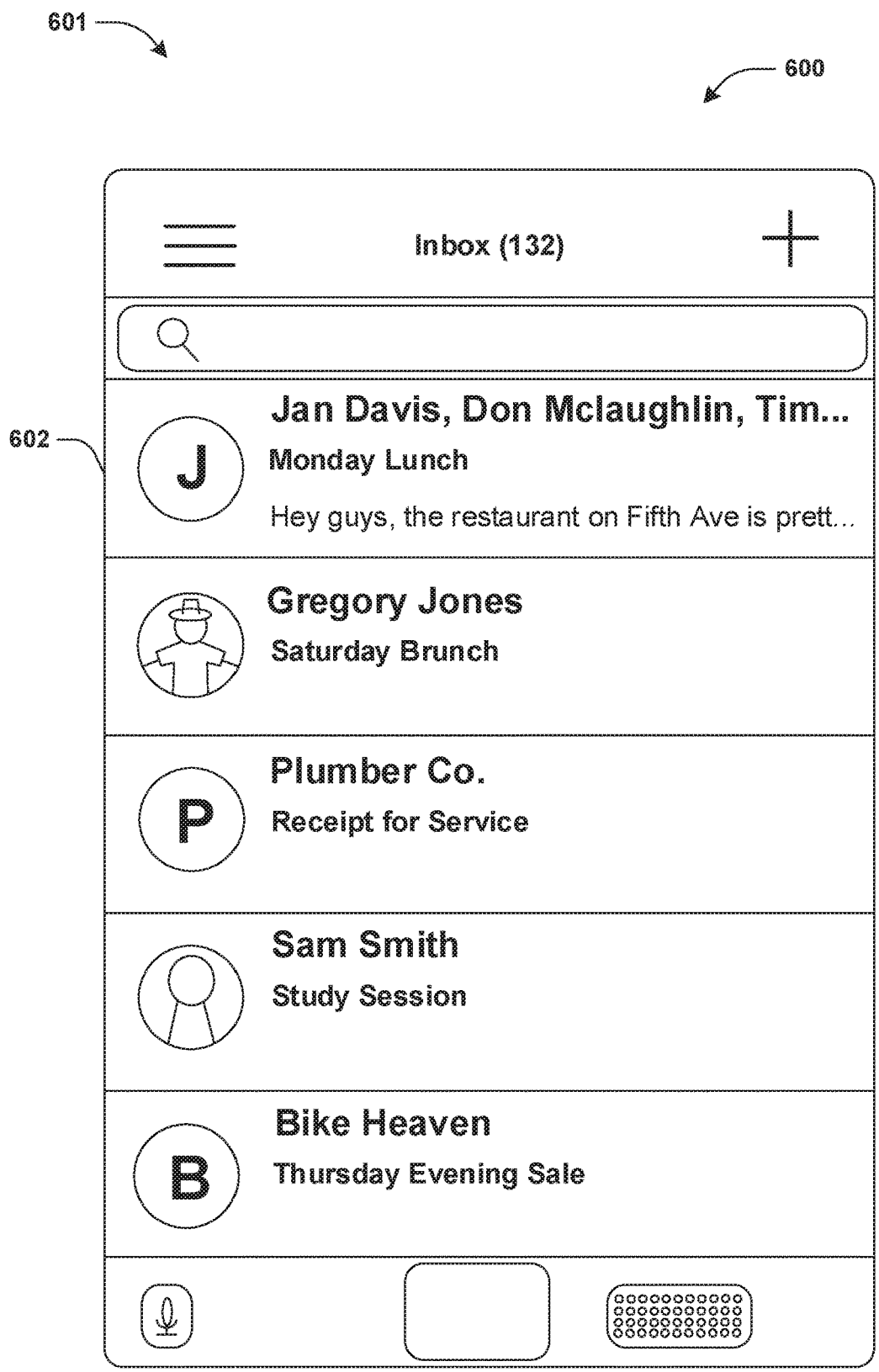
FIG. 6A is a component block diagram illustrating an example system for monitoring levels of activity of client devices, where a graphical user interface of a client device is controlled to display a system interface.

FIG. 6A illustrates a graphical user interface of the first client device 600 being controlled to display a system interface associated with the system 601. For example, the system interface may comprise a plurality of selectable inputs (e.g., the plurality of selectable inputs may correspond to emails of a list of emails) comprising a first selectable input 602 corresponding to a first email. For example, a selection of the first selectable input 602 may be received.

Figure 6B:
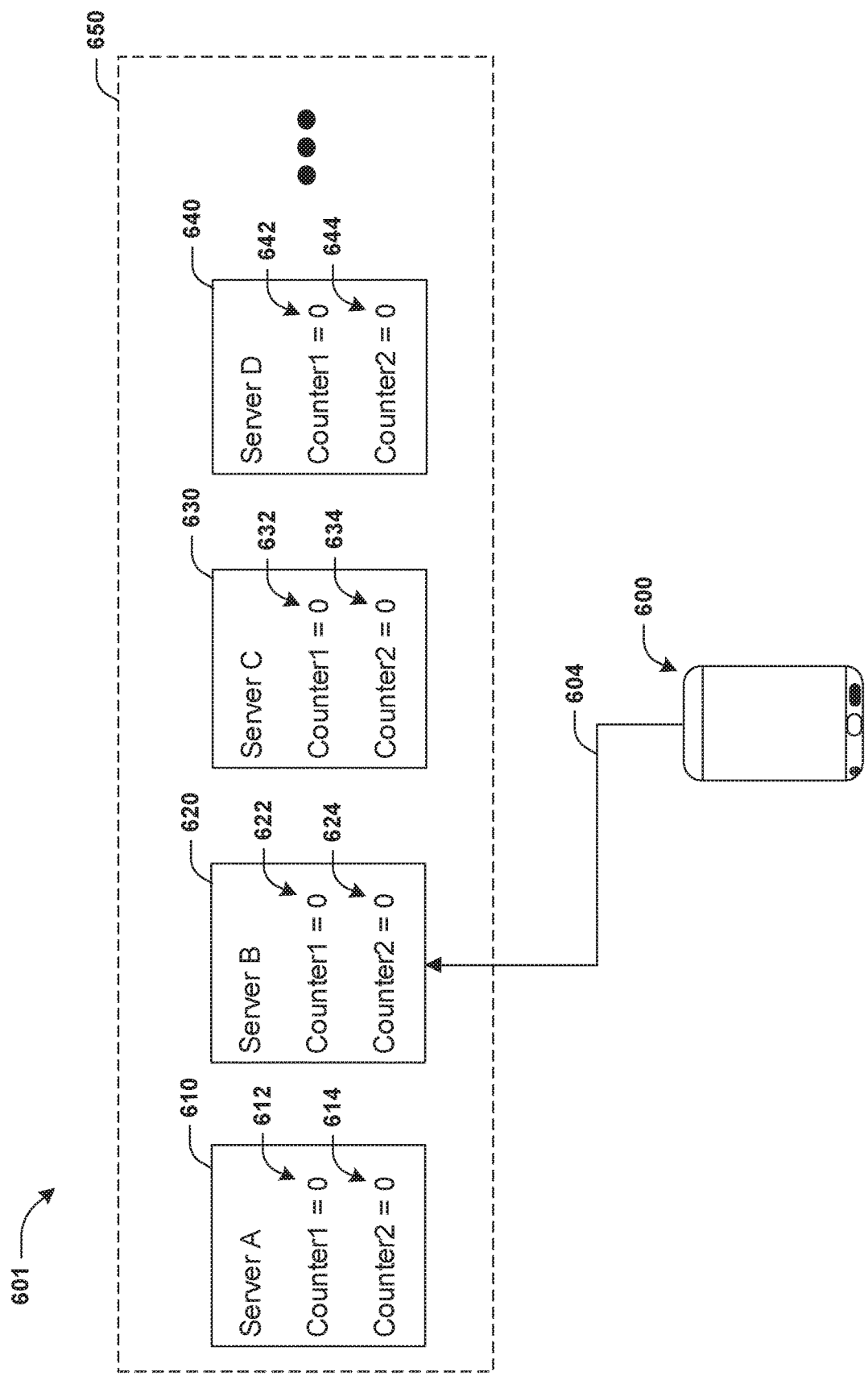
FIG. 6B is a component block diagram illustrating an example system for monitoring levels of activity of client devices, where a request is transmitted to a second server.

FIG. 6B illustrates a request 604 (for a service) being transmitted to a second server 620 ("Server B"). For example, the request 604 may be transmitted to the second server 620 by the first client device 600 responsive to the selection of the first selectable input 602. For example, the request 604 may be a request for content (e.g., a request to be provided with the first email). Alternatively and/or additionally, the request 604 may be an authentication request. In some examples, the second server 620 may be a part of a cluster of servers 650. For example, the cluster of servers 650 may comprise 100 servers (and/or a different quantity of servers). For example, a first quantity of servers of the cluster of servers 650 may be 100. For example, the cluster of servers 650 may comprise a first server 610 ("Server A"), the second server 620, a third server 630 ("Server C"), a fourth server 640 ("Server D") and/or 96 other servers.

In some examples, each server of the cluster of servers 650 may have a set of counter values, associated with the first client device 600, stored within a database of the server. For example, a first set of counter values, associated with the level of activity of the first client device 600, may be stored in a first database of the first server 610. For example, the first set of counter values may comprise a first counter value 612 ("Counter1") and/or a second counter value 614 ("Counter2"). In some examples, the first counter value 612 may be associated with requests received from the first client device 600 (e.g., the first counter value 612 may be incremented responsive to receiving requests from the first client device 600). Alternatively and/or additionally, the second counter value 614 may be associated with data packets (e.g., increment commands), corresponding to the first client device 600, received from servers of the cluster of servers 650 (e.g., the second counter value 614 may be incremented responsive to receiving data packets, associated with the first client device 600, from servers of the cluster of servers 650).

Alternatively and/or additionally, a second set of counter values, associated with the level of activity of the first client device 600, may be stored in a second database of the second server 620. For examples, the second set of counter values may comprise a third counter value 622 ("Counter1") and/or a fourth counter value 624 ("Counter2"). In some examples, the third counter value 622 may be associated with requests received from the first client device 600. Alternatively and/or additionally, the fourth counter value 624 may be associated with data packets (e.g., increment commands), corresponding to the first client device 600, received from servers of the cluster of servers 650.

Alternatively and/or additionally, a third set of counter values, associated with the level of activity of the first client device 600, may be stored in a third database of the third server 630. For examples, the third set of counter values may comprise a fifth counter value 632 ("Counter1") and/or a sixth counter value 634 ("Counter2"). In some examples, the fifth counter value 632 may be associated with requests received from the first client device 600. Alternatively and/or additionally, the sixth counter value 634 may be associated with data packets (e.g., increment commands), corresponding to the first client device 600, received from servers of the cluster of servers 650.

Alternatively and/or additionally, a fourth set of counter values, associated with the level of activity of the first client device 600, may be stored in a fourth database of the fourth server 640. For examples, the fourth set of counter values may comprise a seventh counter value 642 ("Counter1") and/or an eighth counter value 644 ("Counter2"). In some examples, the seventh counter value 642 may be associated with requests received from the first client device 600. Alternatively and/or additionally, the eighth counter value 644 may be associated with data packets (e.g., increment commands), corresponding to the first client device 600, received from servers of the cluster of servers 650.

Figure 6C:
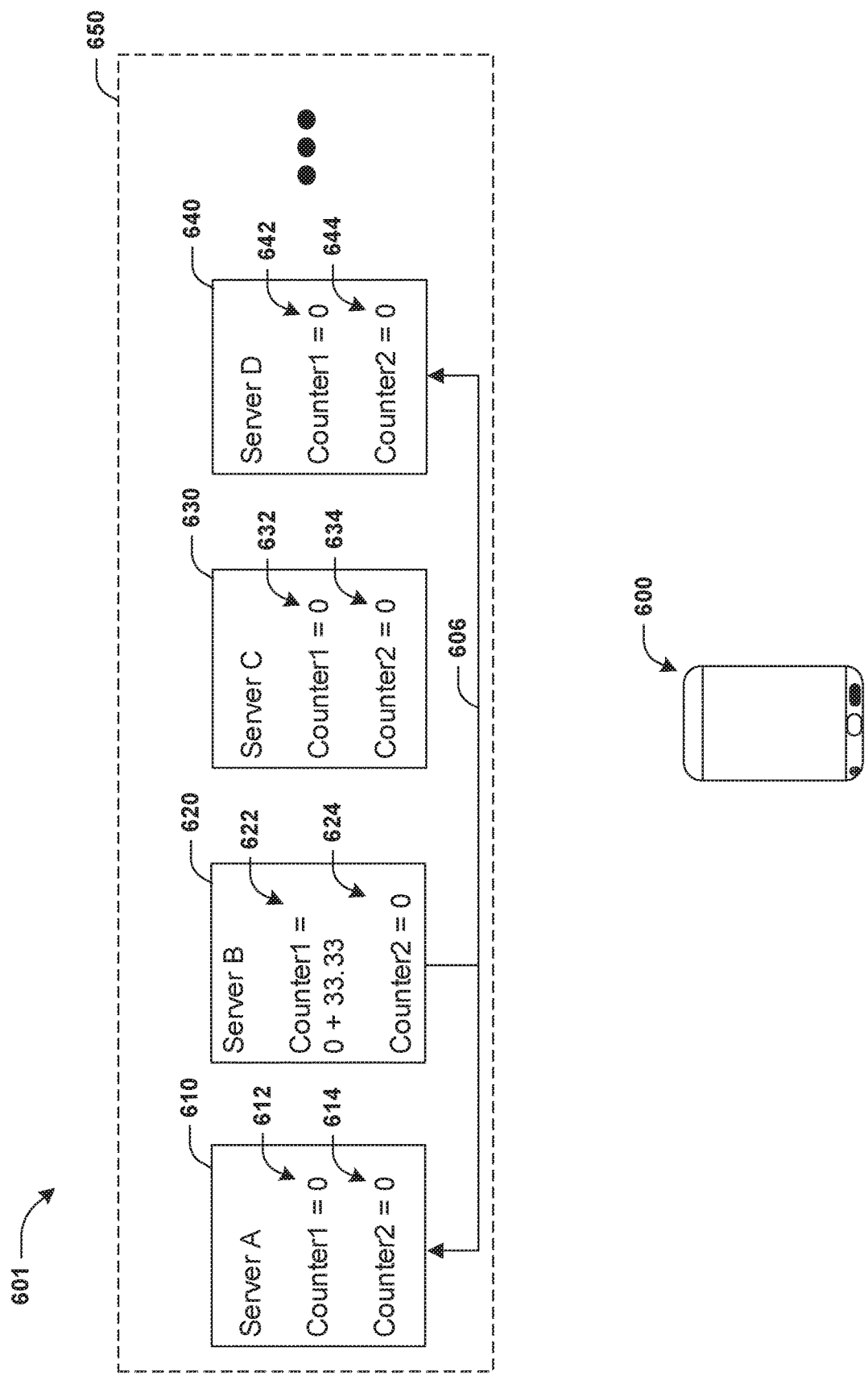
FIG. 6C is a component block diagram illustrating an example system for monitoring levels of activity of client devices, where a third counter value is incremented by a first number.

FIG. 6C illustrates the third counter value 622 being incremented by a first number. For example, the third counter value 622 may be incremented by the first number responsive to the second server 620 receiving the request 604. In some examples, the first number may be equal to a combination of a second number and a third number. For example, the second number may be equal to a first quantity of servers of the cluster of servers 650. Alternatively and/or additionally, the third number may be equal to a second quantity of servers of a first plurality of servers of the cluster of servers 650. The first plurality of servers may comprise the second server 620 and/or one or more first servers (different than the second server 620) of the cluster of servers 650. For example, the one or more first servers may comprise the first server 610 and/or the fourth server 640. For example, the second quantity of servers may be three servers and/or the third number may be equal to three. The first number may be equal to the second number divided by the third number. Accordingly, the first number may be equal to 33.33 (e.g., $$\frac{100}{3}$$

may be rounded to 33.33).

In some examples, one or more first data packets 606 may be transmitted to the one or more first servers. In some examples, the one or more first servers may be selected as recipients of the one or more first data packets 606 using a random selection function, a round robin function, etc. Each data packet of the one or more first data packets 606 may comprise an instruction for a server of the one or more first servers to increment a counter value associated with the first client device 600 by the first number.

Figure 6D:
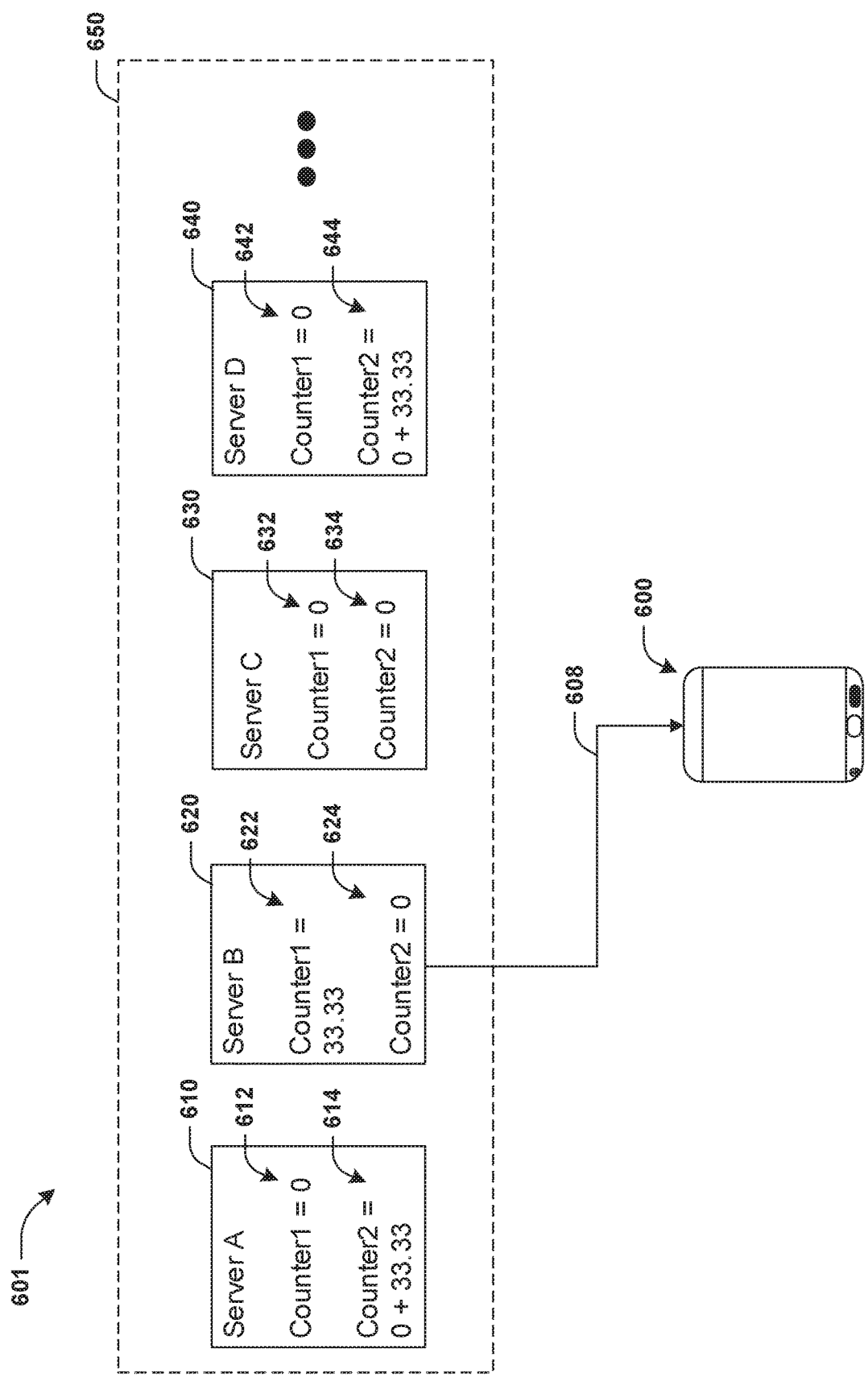
FIG. 6D is a component block diagram illustrating an example system for monitoring levels of activity of client devices, where a second counter value and/or an eighth counter value are incremented by a first number.

FIG. 6D illustrates the second counter value 614 and/or the eighth counter value 644 being incremented by the first number. For example, responsive to the first server 610 receiving a first data packet of the one or more first data packets 606, the second counter value 614 may be incremented by the first number. Alternatively and/or additionally, responsive to the fourth server 640 receiving a second data packet of the one or more first data packets 606, the eighth counter value 644 may be incremented by the first number.

Alternatively and/or additionally, the second server 620 may determine the level of activity of the first client device 600 based upon the third counter value 622 and/or the fourth counter value 624. For example, the level of activity may be determined by performing one or more operations (e.g., mathematical operations) using the third counter value 622 and/or the fourth counter value 624. In some examples, the second server 620 may compare the level of activity with a threshold level of activity (e.g., the threshold level of activity may be 100, 200, 250.6, 1200, etc.). For example, responsive to a determination that the level of activity is less than the threshold level of activity, one or more requested services associated with the request 604 may be performed. For example, first data 608 associated with the content (e.g., the first email) may be transmitted to the first client device 600.

Figure 6E:
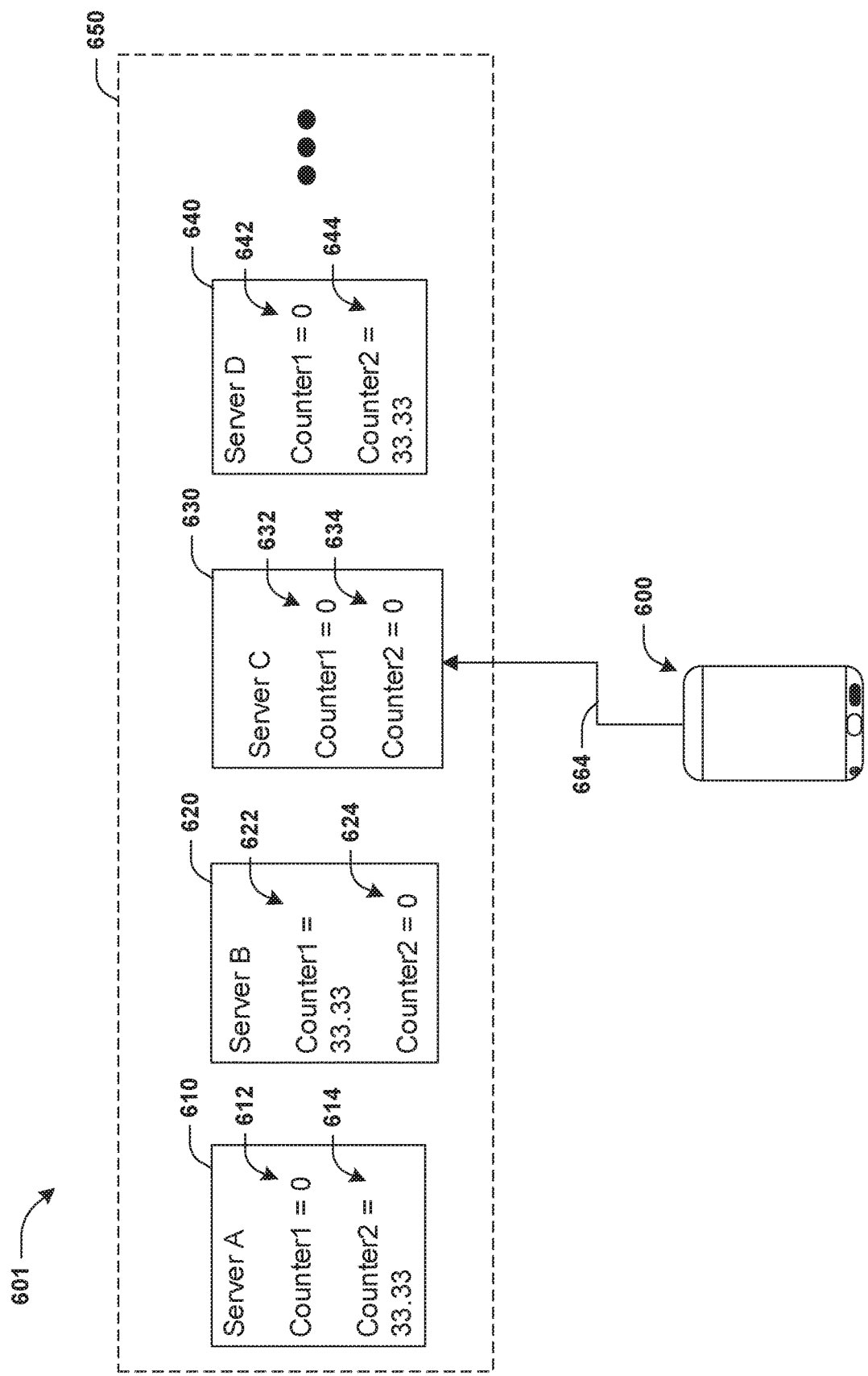
FIG. 6E is a component block diagram illustrating an example system for monitoring levels of activity of client devices, where a second request is transmitted to a third server.
Figure 6F:
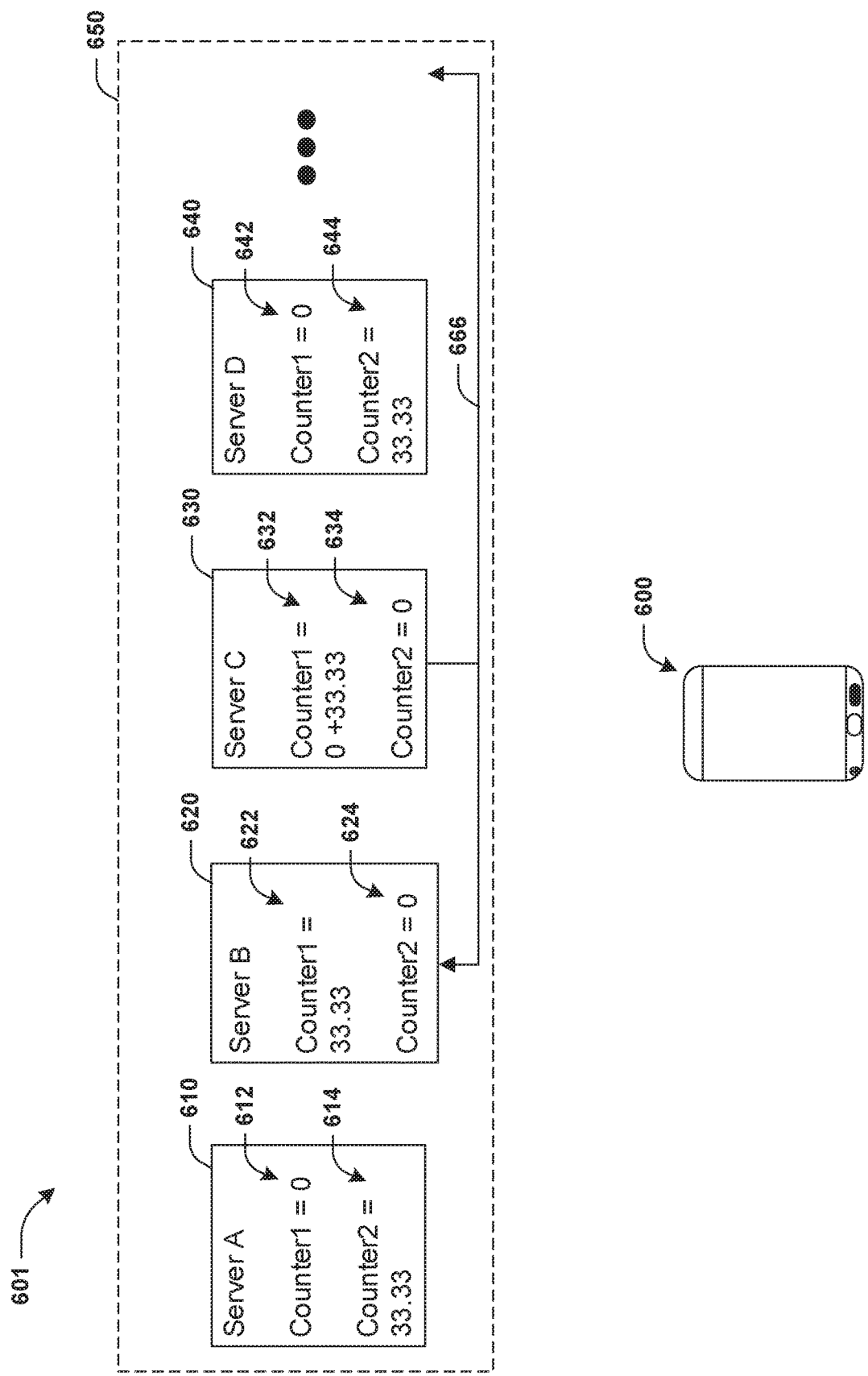
FIG. 6F is a component block diagram illustrating an example system for monitoring levels of activity of client devices, where a fifth counter value is incremented by a first number.

FIG. 6E illustrates a second request 664 (for a service) being transmitted to the third server 630. For example, the second request 664 may be transmitted to the third server 630 by the first client device 600 responsive to a selection of a second selectable input (within the system interface). FIG. 6F illustrates the fifth counter value 632 being incremented by the first number. For example, the fifth counter value 632 may be incremented by the first number responsive to the third server 630 receiving the second request 664. One or more second data packets 666 may be transmitted to one or more second servers. For example, the one or more second servers may comprise the second server 620 and/or a fifth server of the cluster of servers 650. In some examples, the one or more second servers may be selected as recipients of the one or more second data packets 666 using a random selection function, a round robin function, etc. Each data packet of the one or more second data packets 666 may comprise an instruction for a server of the one or more second servers to increment a counter value associated with the first client device 600 by the first number. Alternatively and/or additionally, one or more requested services associated with the second request 668 may be performed (by the third server 630) responsive to a determination that the level of activity of the first client device 600 is less than the threshold level of activity.

Figure 6G:
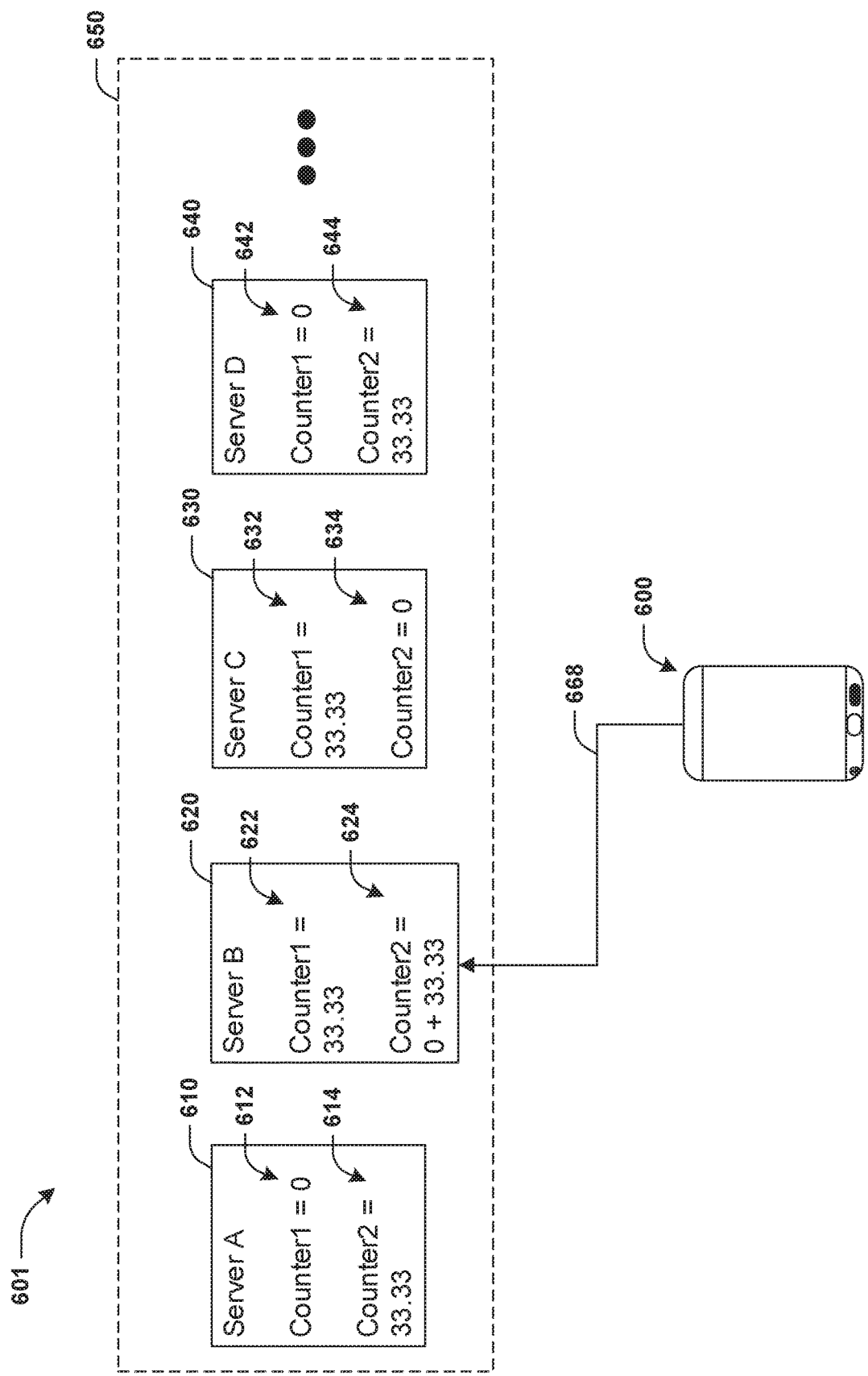
FIG. 6G is a component block diagram illustrating an example system for monitoring levels of activity of client devices, where a fourth counter value is incremented by a first number.

FIG. 6G illustrates the fourth counter value 624 being incremented by the first number. For example, responsive to the second server 620 receiving a third data packet of the one or more second data packets 666, the fourth counter value 624 may be incremented by the first number. Alternatively and/or additionally, a third request 668 (for a service) may be transmitted to the second server 620 by the first client device 600.

Figure 6H:
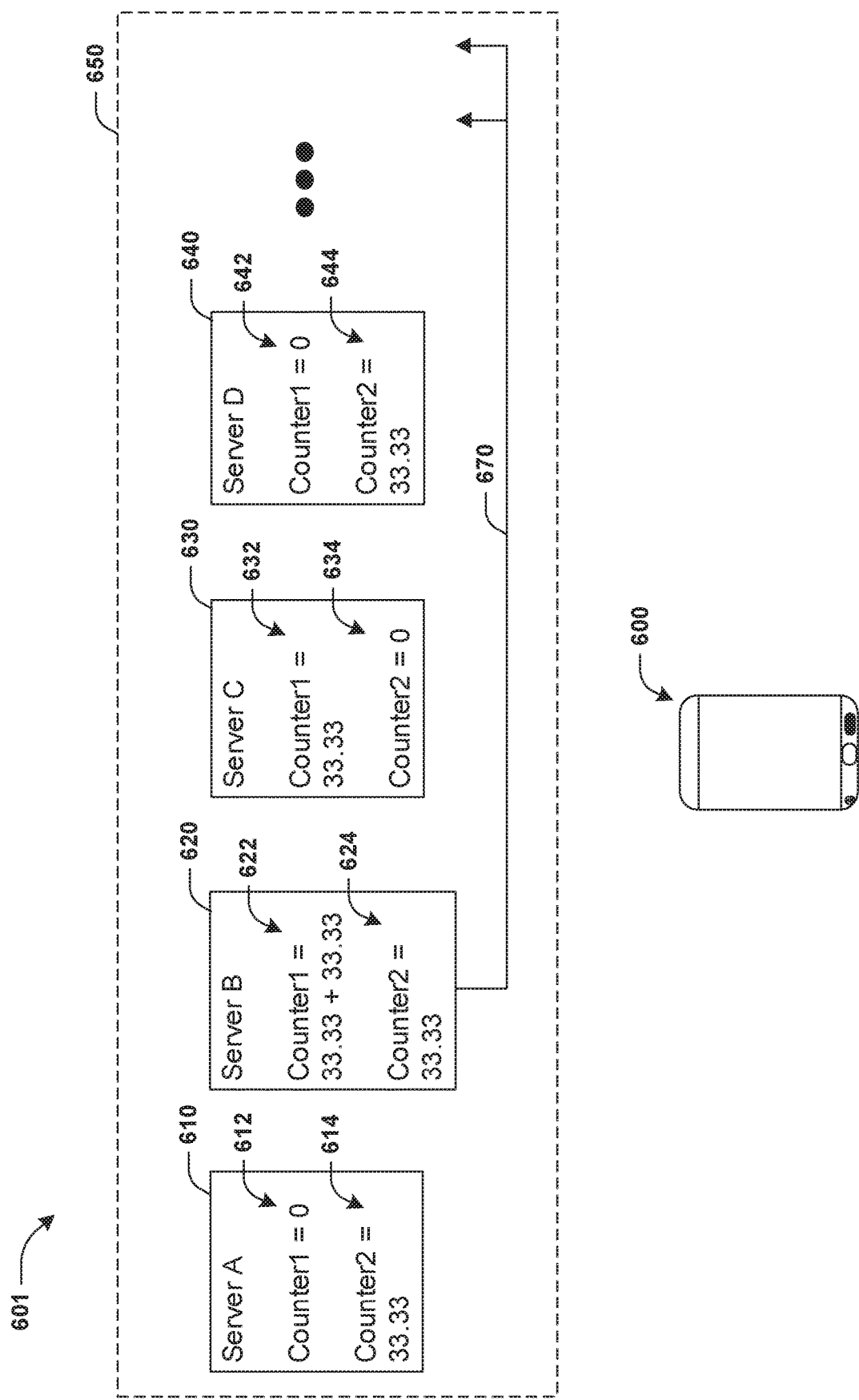
FIG. 6H is a component block diagram illustrating an example system for monitoring levels of activity of client devices, where a third counter value is incremented by a first number.

FIG. 6H illustrates the third counter value 622 being incremented by the first number. For example, the third counter value 622 may be incremented by the first number responsive to the second server 620 receiving the third request 668. In some examples, one or more third data packets 670 may be transmitted to one or more third servers (e.g., the one or more third servers may comprise a sixth server and/or a seventh server of the cluster of servers 650 (e.g., not illustrated)). In some examples, the one or more third servers may be selected as recipients of the one or more third data packets 670 using a random selection function, a round robin function, etc. Each data packet of the one or more third data packets 670 may comprise an instruction for a server of the one or more third servers to increment a counter value associated with the first client device 600 by the first number.

In some examples, the level of activity of the client device 600 (e.g., an updated version of the level of activity) may be determined based upon the third counter value 622 (e.g., 66.66) and/or the fourth counter value 624 (e.g., 33.33). For example, the level of activity may be determined based upon the third counter value 622, a first weight corresponding to the third counter value 622, the fourth counter value 624 and/or a second weight corresponding to the fourth counter value 624. For example, a relationship between the third counter value 622 and the fourth counter value 624 may be determined. For example, a ratio of the third counter value 622 and the fourth counter value 624 may be determined. For example, the ratio may be determined to be 2:1 (e.g., based upon 66.66:33.33).

In some examples, the ratio may be compared with an expected ratio to determine a difference between the ratio and the expected ratio. For example, the expected ratio may be 1:1. For example, the ratio being similar to the expected ratio may be indicative of the second server 620 receiving a quantity of requests from the first client device 600 during a first period of time that is similar to an average quantity of requests received by other servers of the cluster of servers 650. Alternatively and/or additionally, the third counter value 622 being greater than the fourth counter value 624 may indicate that the second server 620 received more requests during the first period of time than the average quantity of requests received by the other servers of the cluster of servers 650. For example, the third counter value 622 being greater than the fourth counter value 624 may indicate that a summation of the third counter value 622 and the fourth counter value 624 may not result in an accurate representation of a second average quantity of requests received by servers of the cluster of servers 650 from the first client device 600 (e.g., the summation of the third counter value 622 and the fourth counter value 624 may be a number higher than the second average quantity of requests).

In some examples, the first weight and/or the second weight may be determined based upon the ratio and/or the expected ratio. For example, because the third counter value 622 is greater than the fourth counter value 624, the first weight corresponding to the third counter value 622 may be less than the second weight corresponding to the fourth counter value 624. In some examples, the first weight may be applied to the third counter value 622 to determine a first weighted counter value. Alternatively and/or additionally, the second weight may be applied to the fourth counter value 624 to determine a second weighted counter value. In some examples, the level of activity of the first client device 600 may be determined by combining the first weighted counter value with the second weighted counter value (e.g., adding the first weighted counter value to the second weighted counter value).

Alternatively and/or additionally, rather than applying the first weight to the third counter value 622 and/or applying the second weight to the fourth counter value 624, the third counter value 622 may be combined with the fourth counter value 624 to generate a combined counter value (e.g., the combined counter value may be equal to the third counter value 622 added to the fourth counter value 624). A third weight may be applied to the combined counter value to determine the level of activity of the first client device 600. For example, the third weight may be determined based upon the ratio and/or the expected ratio. For example, because the third counter value 622 is greater than the fourth counter value 624, the third weight may be less than one (and/or a different number).

Figure 6I:
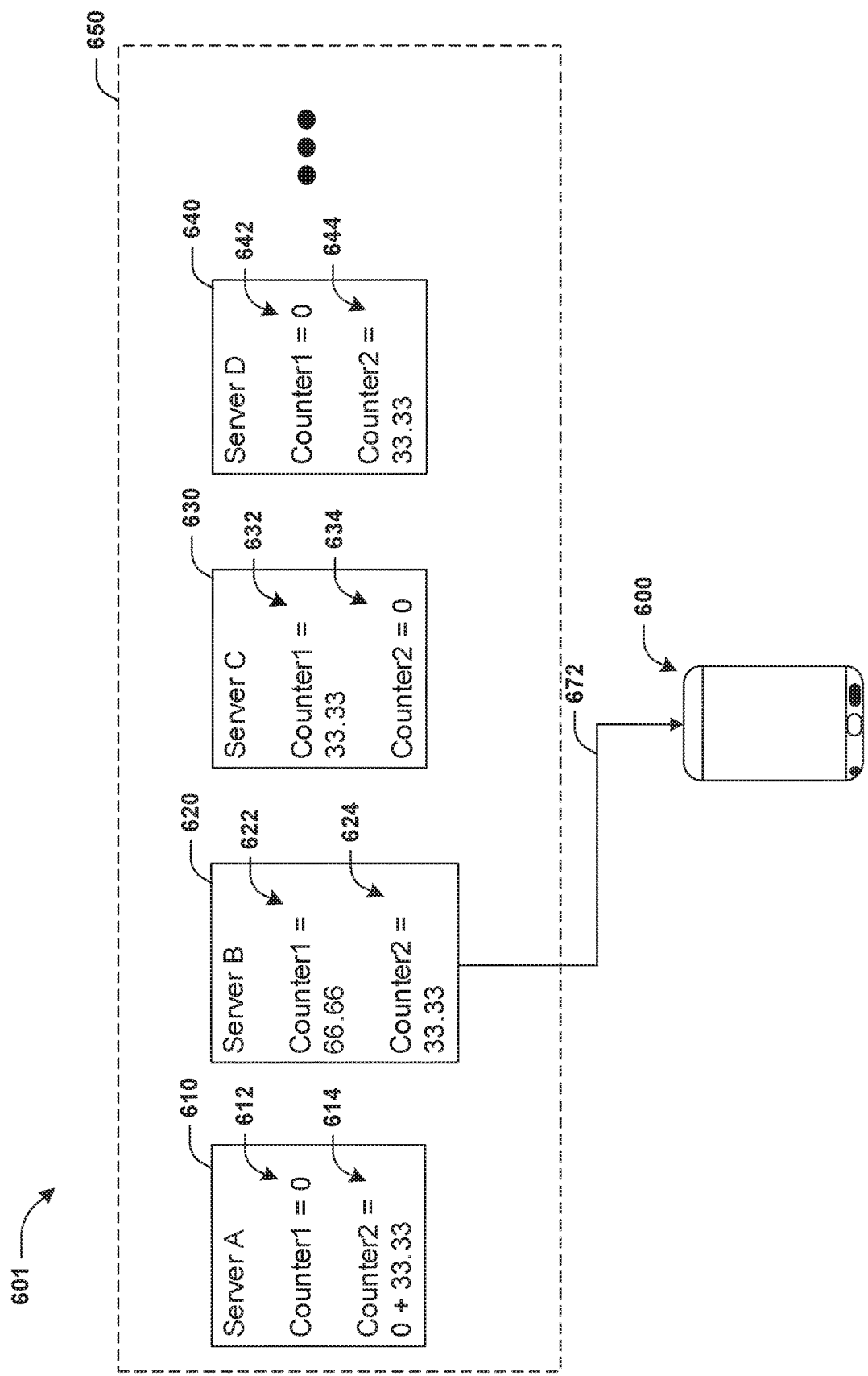
FIG. 6I is a component block diagram illustrating an example system for monitoring levels of activity of client devices, where second data is transmitted to a client device.

In some examples, the level of activity may be compared with the threshold level of activity. For example, responsive to a determination that the level of activity is less than the threshold level of activity, one or more second requested services associated with the third request 668 may be performed. FIG. 6I illustrates second data 672 being transmitted to the first client device 600. For example, the second data 672 may be associated with the one or more second requested services associated with the third request 668.

Implementation of at least some of the disclosed subject matter may lead to benefits including, but not limited to, more accurately determining a level of activity associated with a client device (e.g., as a result of taking into account that requests transmitted by the client device may be unevenly distributed across servers of a cluster of servers, as a result of implementing one or more techniques associated with the method 400 and/or the method 450, such that even in cases with uneven distribution of requests received by the servers of the cluster of servers, a count value and/or a level of activity associated with the client device maintained by a server of the cluster of servers may be an accurate representation of an average count value and/or an average level of activity associated with the client device, etc.). Alternatively and/or additionally, implementation of at least some of the disclosed subject matter may lead to benefits including improving the security of computing systems by protecting them from malicious activity, such as spamming, denial of service attacks, hacking attacks, etc., as a result of implementing a throttle limit to limit a number of instances that resources are used by the cluster of servers responsive to receiving requests from the client device, for example. Alternatively and/or additionally, implementation of at least some of the disclosed subject matter may lead to benefits including decreasing resources needed to monitor the level of activity associated with the client device (e.g., as a result of the cluster of servers comprising a decentralized network architecture, such as a peer-to-peer network architecture, where rather than using a centralized approach of storing level of activity information determined by each server of the cluster of servers in a centralized database, the level of activity information may be shared between servers of the cluster of servers, as a result of servers transmitting data packets (e.g., increment commands) to merely a subset of servers of the cluster of servers responsive to receiving requests from the client device, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 7:
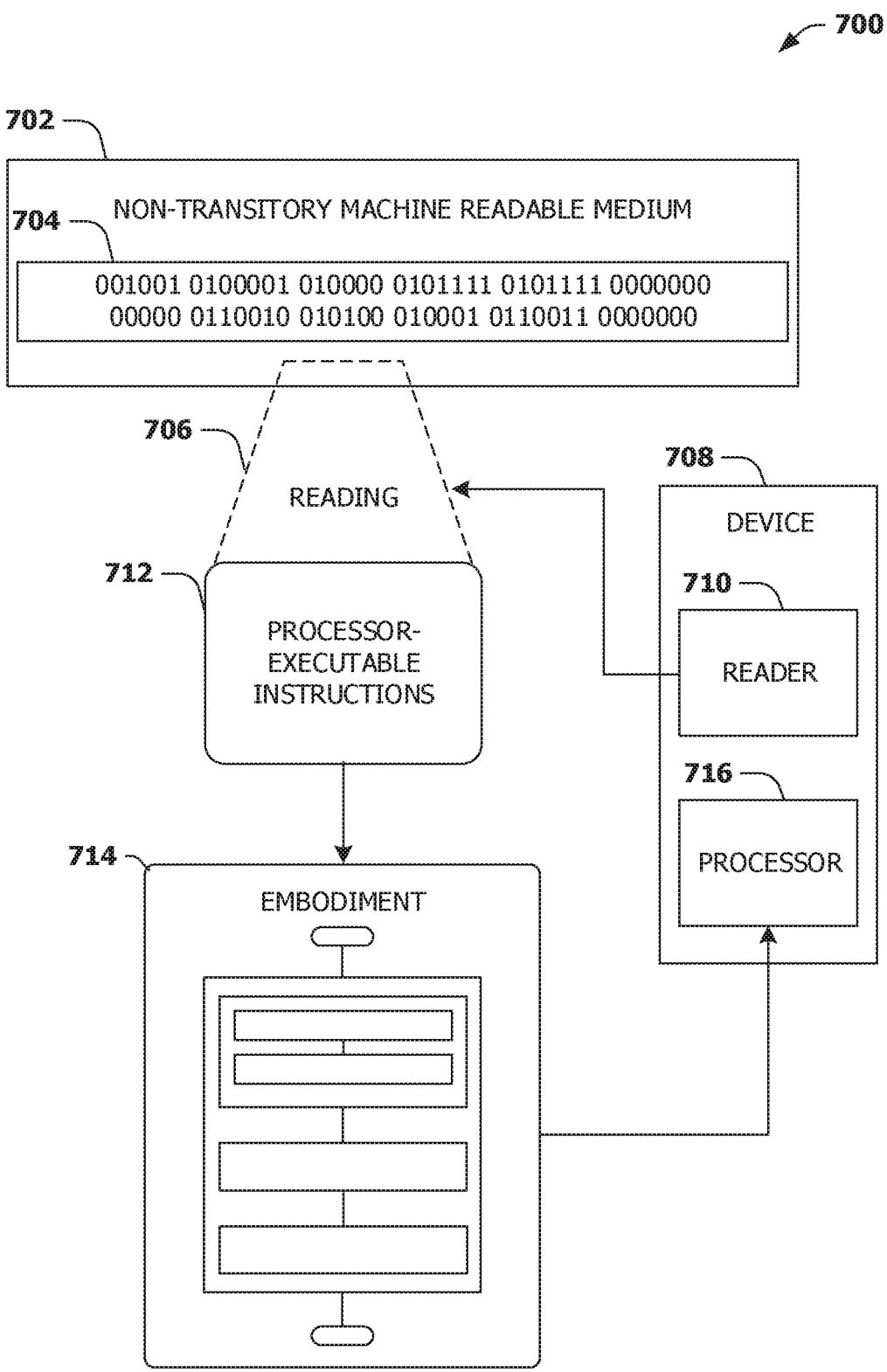
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4A, and/or at least some of the example method 450 of FIG. 4B, for example. In some embodiments, the processor-executable instructions 712 are configured to cause implementation of a system, such as at least some of the example system 501 of FIGS. 5A-5E, and/or at least some of the example system 601 of FIGS. 6A-6I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving, using a first server in a cluster of servers, a request for a service from a client device;
   responsive to receiving the request for the service, incrementing, using the first server, a first counter value associated with a level of activity of the client device by a first number;
   selecting, as recipients of one or more data packets associated with the level of activity of the client device, a subset of one or more servers, but not one or more other servers, from a plurality of servers in the cluster of servers;
   generating the one or more data packets to each comprise an instruction to increment, in association with the same request for the service, a counter value associated with the client device by a second number different than the first number by which the first counter value was incremented, in association with the same request for the service, using the first server; and
   transmitting the one or more data packets from the first server to the subset of one or more servers of the plurality of servers but not the one or more other servers of the plurality of servers, wherein:
   transmission of the one or more data packets to the subset rather than all of the plurality of servers is associated with a mitigation of resource usage;
   the second number, by which the instruction in each data packet of the one or more data packets provides for incrementing a counter value in association with the request for the service, is determined based upon a combination of the first number by which the first counter value was incremented using the first server, a third number and a fourth number;
   the third number is equal to a first quantity of servers of the plurality of servers including both the subset of one or more servers and the one or more other servers; and
   the fourth number is equal to a second quantity of servers of the subset of one or more servers, wherein the first quantity of servers of the plurality of servers from which the subset of one or more servers were selected is different than the second quantity of servers of the subset of one or more servers.

2. The method of claim 1, wherein the second number is equal to a product of the first number and the third number divided by the fourth number.

3. The method of claim 1, wherein the selecting the subset of one or more servers is based upon a round robin function.

4. The method of claim 1, wherein the selecting the subset of one or more servers is based upon a first set of instructions received prior to receiving the request.

5. The method of claim 1, wherein:
   each server of the cluster of servers shares information associated with levels of activity of client devices with other servers of the cluster of servers.

6. The method of claim 1, comprising:
   performing one or more operations based upon a comparison of the first counter value with a threshold counter value.

7. The method of claim 1, comprising:
   responsive to the receiving the request, comparing the first counter value with a threshold counter value; and
   performing one or more operations associated with the request based upon a determination that the first counter value is less than the threshold counter value.

8. The method of claim 6, wherein:
   the threshold counter value is associated with a throttle limit; and
   the throttle limit limits a number of instances that resources are used by the cluster of servers responsive to receiving requests from the client device.

9. The method of claim 1, wherein:
   the first counter value is associated with a first representation of a client identifier associated with the client device;
   the request for the service comprises a second representation of the client identifier; and
   the first counter value is selected for being incremented by the first number based upon a comparison of the first representation of the client identifier with the second representation of the client identifier.

10. The method of claim 1, comprising:
    determining a timestamp associated with a second request received from the client device, the second request received prior to the receiving the request for the service; and decrementing the first counter value based upon a comparison of the timestamp and a time associated with the receiving the request for the service.

11. The method of claim 10, wherein the first counter value is decremented based upon at least one of an exponential decay function or a linear decay function.

12. The method of claim 1, wherein the selecting the subset of one or more servers is based upon a random selection function.

13. The method of claim 1, wherein the one or more data packets are generated in accordance with user datagram protocol (UDP).

14. A computing device comprising:
a processor; and
memory comprising processor-executable instructions that when executed by the processor cause performance of operations, the operations comprising:
receiving, using a first server, a request for a service from a client device;
responsive to receiving the request, incrementing, using the first server, a first counter value associated with a level of activity of the client device by a first number;
generating one or more data packets; and
transmitting the one or more data packets, based upon the request, from the first server to a subset of one or more servers of a plurality of servers but not one or more other servers of the plurality of servers, wherein:
each data packet of the one or more data packets comprises an instruction for a server of the subset of one or more servers to increment, in association with the same request for the service, a counter value associated with the client device by a second number different than the first number by which the first counter value was incremented, in association with the same request for the service, using the first server;
the second number is determined based upon a combination of the first number, a third number and a fourth number;
the third number is equal to a first quantity of servers of the plurality of servers including both the subset of one or more servers and the one or more other servers; and
the fourth number is equal to a second quantity of servers of the subset of one or more servers, wherein the first quantity of servers of the plurality of servers is different than the second quantity of servers of the subset of one or more servers.

15. The computing device of claim 14, wherein the second number is equal to a product of the first number and the third number divided by the fourth number.

16. The computing device of claim 14, wherein the subset of one or more servers is based upon a first set of instructions received prior to receiving the request.

17. The computing device of claim 14, wherein the first number is based upon a first set of instructions received prior to receiving the request.

18. The computing device of claim 14, wherein:
the plurality of servers and the first server are comprised within a cluster of servers; and
each server of the cluster of servers shares information associated with levels of activity of client devices with other servers of the cluster of servers.

19. The computing device of claim 14, the operations comprising:
performing one or more operations based upon a comparison of the first counter value with a threshold counter value.

20. A non-transitory machine readable medium having stored thereon processor-executable instructions that when executed cause performance of operations, the operations comprising:
receiving, using a first server, a request for a service from a client device;
responsive to receiving the request: decrementing a first counter value associated with a level of activity of the client device by a first number;
generating one or more data packets; and
transmitting the one or more data packets, based upon the request, to a subset of one or more servers of a plurality of servers, wherein:
each data packet of the one or more data packets comprises an instruction for a server of the subset of one or more servers to decrement, in association with the same request for the service, a counter value associated with the client device by a second number different than the first number by which the first counter value was decremented in association with the same request for the service;
the second number is determined based upon a combination of the first number, a third number and a fourth number;
the third number is equal to a first quantity of servers of the plurality of servers; and
the fourth number is equal to a second quantity of servers of the subset of one or more servers.

* * * * *